United States Patent
Feltrin et al.

(10) Patent No.: US 12,219,570 B2
(45) Date of Patent: Feb. 4, 2025

(54) SPECIFYING CONTENT OF QUALITY REPORT IN Msg3

(71) Applicant: Telefonaktiebolaget LM Ericsson (publ), Stockholm (SE)

(72) Inventors: Luca Feltrin, Bromma (SE); Dung Pham Van, Upplands Väsby (SE); Johan Bergman, Stockholm (SE); Ritesh Shreevastav, Upplands Väsby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 370 days.

(21) Appl. No.: 17/425,799

(22) PCT Filed: Jan. 23, 2020

(86) PCT No.: PCT/SE2020/050053
§ 371 (c)(1),
(2) Date: Jul. 26, 2021

(87) PCT Pub. No.: WO2020/159419
PCT Pub. Date: Aug. 6, 2020

(65) Prior Publication Data
US 2022/0201662 A1    Jun. 23, 2022

Related U.S. Application Data

(60) Provisional application No. 62/797,640, filed on Jan. 28, 2019.

(51) Int. Cl.
*H04W 72/04*   (2023.01)
*H04W 72/23*   (2023.01)
(Continued)

(52) U.S. Cl.
CPC ......... *H04W 72/23* (2023.01); *H04W 72/542* (2023.01); *H04W 74/0833* (2013.01)

(58) Field of Classification Search
CPC ..... H04W 75/542; H04W 4/70; H04W 72/20; H04W 72/23; H04W 74/0833
See application file for complete search history.

(56) References Cited

U.S. PATENT DOCUMENTS

2006/0165188 A1* 7/2006 Wunder .............. H04L 27/2601
                                                               375/260
2019/0020424 A1    1/2019 Yerramalli et al.
(Continued)

OTHER PUBLICATIONS

International Search Report and Written Opinion dated Apr. 30, 2020 for international Application No. PCT/SE2020/050053 filed Jan. 23, 2020, consisting of 14-pages.
(Continued)

*Primary Examiner* — Mansour Oveissi
(74) *Attorney, Agent, or Firm* — Weisberg I.P. Law, P.A.

(57) ABSTRACT

Systems and methods for specifying content of carrier measurement reports in a cellular communication system are disclosed. Embodiments of a method performed by a wireless device are disclosed. In some embodiments, the method performed by the wireless device includes transmitting a random access preamble, receiving, from a base station, a random access response, and transmitting, to the base station, a Msg3 comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level. Some embodiments include transmitting, to a base station, an uplink message including the one or
(Continued)

more quality reports for the one or more carriers or narrowbands.

17 Claims, 11 Drawing Sheets

(51) Int. Cl.
     *H04W 72/542*       (2023.01)
     *H04W 74/0833*     (2024.01)

(56) References Cited

U.S. PATENT DOCUMENTS

2021/0219166 A1* 7/2021 Morozov ............... H04L 1/203
2021/0282042 A1* 9/2021 Park ..................... H04W 24/10

OTHER PUBLICATIONS

3GPP TSG RAN WG1 Meeting #95 R1-1813719; Title: Feature lead summary of support of quality report in Msg3 for non-anchor access; Agenda Item: 6.2.2.5; Source: Huawei, HiSilicon; Document for: Discussion and decision; Date and Location: Nov. 12-16, 2018, Spokane, USA, consisting of 9-pages.

3GPP TSG-RAN WG1 Meeting #95 Tdoc R1-1813588; Title: Support of DL quality report in connected mode in NB-IoT; Agenda Item: 6.2.2.7; Source: Ericsson; Document for: Discussion; Date and Location: Nov. 12-16, 2018, Spokane, USA, consisting of 5-pages.

3GPP TSG-RAN WG2 #105 Tdoc R2-1900560; Title: Msg3 Quality Report Format for eMTC; Agenda Item: 12.1.6; Source: Ericsson; Document for: Discussion, Decision; Date and Location: Feb. 25-Mar. 1, 2019, Athens, Greece, consisting of 7-pages.

3GPP TSG-RAN WG2 #105 R2-1901184; Title: Msg3 Quality Report Format for NB-IoT; Agenda Item: 12.2.7; Source: Ericsson; Document for: Discussion, Decision; Date and Location: Feb. 25-Mar. 1, 2019, Athens, Greece, consisting of 5-pages.

3GPP TSG-RAN WG1 Meeting #95 R1-1813796; Title: RAN1 agreements for Rel-16 Additional Enhancements for NB-IoT; Agenda Item: 6.2.2; Source: WI rapporteur (Huawei); Document for: Information; Date and Location: Nov. 12-16, 2018, Spokane, USA, consisting of 10-pages.

3GPP TSG-RAN WG2 Meeting #104 R2-1818633; Title: RAN2 agreements for Rel-16 additional enhancements for NB-IoT and MTC; Agenda Item: 12.1.1 and 12.2.1; Source: Document Rapporteur (Blackberry); Document for: Email endorsement; Date and Location: Nov. 12-16, 2018, Spokane, USA, consisting of 7-pages.

3GPP TSG RAN Meeting #80 RP-181450; Title: New WID on Rel-16 MTC enhancements for LTE; Agenda Item: 10.1.3; Source: Ericsson; Document for: Approval; Date and Location: Jun. 11-14, 2018, La Jolla, USA, consisting of 4-pages.

3GPP TSG RAN Meeting #80 RP-181451; Title: New WID on Rel-16 enhancements for NB-IoT; Agenda Item: 10.1.3; Source: Ericsson, Huawei; Document for: Approval; Date and Location: Jun. 11-14, 2018, La Jolla, USA, consisting of 4-pages.

3GPP TSG RAN Meeting #82 RP-182594 (revision of RP-181878); Title: Revised WID: Additional MTC enhancements for LTE; Agenda Item: 10.4.1; Source: Ericsson; Document for: Approval; Date and Location: Dec. 10-13, 2018, Sorrento, Italy, consisting of 4-pages.

ETSI TS 136 133 V15.4.0; LTE; Evolved Universal Terrestrial Radio Access (E-UTRA); Requirements for support of radio resource management (3GPP TS 36.133 version 15.4.0 Release 15), Jan. 2019, consisting of 3220-pages.

3GPP TS 36.321 V15.0.0; 3rd Generation Partnership Project; Technical Specification Group Radio Access Network; Evolved Universal Terrestrial Radio Access (E-UTRA); Medium Access Control (MAC) protocol specification (Release 15), Dec. 2017, consisting of 109-pages.

3GPP TS 36.321 V15.3.0; 3rd Generation Partnership Project; Technical Specification Group Radio Access Network; Evolved Universal Terrestrial Radio Access (E-UTRA); Medium Access Control (MAC) protocol specification (Release 15), Sep. 2018, consisting of 127-pages.

* cited by examiner

SPECIFYING CONTENT OF QUALITY REPORT IN Msg3

CROSS-REFERENCE TO RELATED APPLICATIONS

This application is a Submission Under 35 U.S.C. § 371 for U.S. National Stage Patent Application of International Application No.: PCT/SE2020/050053, filed Jan. 23, 2020 entitled "SPECIFYING CONTENT OF QUALITY REPORT IN MSG3," which claims priority to U.S. Provisional Application No. 62/797,640, filed Jan. 28, 2019, the entireties of both of which are incorporated herein by reference.

RELATED APPLICATIONS

This application claims the benefit of U.S. provisional patent application Ser. No. 62/797,640, filed Jan. 28, 2019, the disclosure of which is hereby incorporated herein by reference in its entirety.

TECHNICAL FIELD

The present disclosure relates to reporting carrier measurements in a cellular communication system.

BACKGROUND

The Third Generation Partnership Project (3GPP) Release (Rel) 16 work-items [3][4][5] include the following objectives for enhanced Machine Type Communication (eMTC) and Narrowband Internet of Things (NB-IoT) enhancement:
  Specify quality report in Msg3 at least for Early Data Transmission (EDT) [RAN1, RAN2] (eMTC).
  Specify support of Msg3 quality reporting for non-anchor access [RAN1, RAN2] (NB-IoT).
  Specify aperiodic quality report in connected mode using same quality definition as in Msg3 [RAN1, RAN2, RAN4] (eMTC).
To improve downlink (DL) transmission efficiency and/or UE power consumption, one of the objectives is to specify quality report in Msg3.
  Currently (Rel.14), for NB-IoT, possible measurements are performed during T1 and T2. T1 corresponds to the time interval when a User Equipment (UE) performs coverage extension estimation, while T2 corresponds to the time from the beginning of Random Access Response (RAR) (i.e., Msg2) DCI reception until the beginning of Msg3 transmission. T3 corresponds to the time from the end of reception of Msg2 until the beginning of transmission of Msg3. They are all depicted in FIG. 1. FIG. 1 illustrates definitions of T1 and T2 according to [2] for LTE-M.
  The outcome representing the number of repetitions to be used for Narrowband Physical Data Control Channel (NPDCCH) is encoded as 4 bits. It is possible to report "noMeasurement" to indicate the absence of useful data or for legacy UEs and UEs without the reporting functionality. The Radio Resource Control (RRC) message in Msg3 was extended to include these 4 additional bits. Normally, for UEs, the Msg3 Medium Access Control (MAC) Protocol Data Unit (PDU) is built upon reception of the uplink (UL) grant in RAR during the Random Access (RA) procedure, i.e., after the RRC layer built the RRC message to be included in Msg3. Modifying its content after T2 requires interaction between MAC and RRC layers, as captured in the specification with a note in [3].

In RAN1#94, RAN1#94bis, RAN1#95, RAN2#103bis and RAN2#104 the following relevant agreements were made [6][7]:
  NB-IoT
    Re-use the code points defined in Rel-14.
      In case 4 bits are used for a non-anchor carrier, all repetition, i.e., 12 candidate values {1,2,4,8,16,32, 64,128,256,512,1024,2048} can be reported in Msg3.
      Still open issue for 2 bits.
    Study the impact of re-using the Rel-14 RRC reporting mechanism and consider whether a MAC mechanism should be used instead.
    RAN2 further study how to support the use case of enabling measurements in non-anchor carrier while reducing measurement on anchor carrier.
  eMTC
    RAN2 waits for progress on the discussion of Mobile Terminated EDT (MT-EDT) before deciding on whether channel quality report in Msg3 is introduced for EDT.
    Channel quality report in Msg3 is introduced for non-EDT.
    DL quality report is transmitted via higher layer signaling, e.g. MAC CE or RRC message.
    For Coverage Enhancement (CE) mode A (Physical Random Access Channel (PRACH) CE level 0, 1) and CE mode B, the downlink channel quality is the repetition number and/or aggregation level that the UE needs to decode hypothetical MTC Physical Downlink Control Channel (MPDCCH) with Block Error Rate (BLER) of 1%.
    Enabling of DL quality report is indicated in System Information Block (SIB).
Note that the terms eMTC, LTE-M, LTE-MTC and Bandwidth Limited (BL)/Coverage Enhancement (CE) UEs are interchangeable
  There currently exist certain challenge(s) in relation to measurement reporting. In legacy NB-IoT, RRC (Layer 3) based reporting is done. The legacy quality report is limited to a single measurement in the anchor carrier, where the anchor carrier is the carrier on which the NB-IoT UE receives synchronization signals (i.e., the Narrowband Primary Synchronization Signal (NPSS) and the Narrowband Secondary Synchronization Signal (NSSS)) as well as broadcast information (i.e., broadcast information via Narrowband Physical Broadcast Channel (NPBCH)). Also eMTC does not include a reporting mechanism.

SUMMARY

Systems and methods for specifying content of carrier measurement reports in a cellular communication system are disclosed. Embodiments of a method performed by a wireless device are disclosed. In some embodiments, the method performed by the wireless device comprises transmitting, to a base station, an uplink message comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level. In some embodiments, the method further comprises transmitting a random access preamble, and receiving, from the base station, a random access response, wherein transmitting the uplink message comprises transmitting, to the base station, a Msg3 comprising the one or more quality reports for the one or more carriers or narrowbands.

In some embodiments, the one or more quality reports comprise a single quality report comprising an aggregate metric for two or more carriers or narrowbands. In some embodiments, the aggregate metric is a number of repetitions to be used for physical downlink control channel transmissions to the wireless device on any of the two or more carriers or narrowbands, the aggregate metric being a function of measurements made by the wireless device on the two or more carriers or narrowbands. In some embodiments, the quality report further comprises an indication that the aggregate metric is an aggregate metric.

In some embodiments, the one or more carriers or narrowbands comprise one or more non-anchor carriers, wherein a non-anchor carrier is a carrier other than an anchor carrier of the wireless device where an anchor carrier is a carrier on which the wireless device receives synchronization signals as well as broadcast information. In some embodiments, each of the one or more quality reports comprises the value indicative of a number of repetitions to be used for physical downlink control channel transmissions to the wireless device on a respective one of the one or more carriers or narrowbands. In some embodiments, each of the one or more quality reports comprises the value indicative of a number of repetitions needed by the wireless device to decode physical downlink control channel transmissions on a respective one of the one or more carriers or narrowbands with a block error rate of 1%. In some embodiments, transmitting the uplink message comprises transmitting the uplink message when in connected mode.

In some embodiments, each of the one or more quality reports comprises the value indicative of a number of repetitions to be used for physical downlink control channel transmissions to the wireless device on a respective one of the one or more carriers or narrowbands.

In some embodiments, each of the one or more quality reports comprises the value indicative of a number of repetitions needed by the wireless device to decode physical downlink control channel transmissions on a respective one of the one or more carriers or narrowbands with a block error rate of 1%.

In some embodiments, the one or more carriers or narrowbands comprise a non-anchor carrier of the wireless device on which measurement is performed during a time from a beginning of the receiving of the random access response until a beginning of transmitting, to the base station, the Msg3.

In some embodiments, the one or more quality reports comprise a quality report comprising a metric value that is one of a plurality of predefined codepoints. In some embodiments, the plurality of predefined codepoints represent a plurality of possible combinations of the value indicating a number of repetitions, an index(es) of the one or more carriers or narrowbands, and an aggregation indication that indicates whether the metric value is an aggregate value for two or more carriers or narrowbands or a value for a single carrier or narrowband.

In some embodiments, the one or more quality reports are comprised within the uplink message in a Medium Access Control (MAC) Control Element (CE) structure. In some embodiments, the one or more quality reports are a single quality report for a carrier or narrowband, and the single quality report is comprised in a MAC CE octet in which 4 bits of the MAC CE octet represent the value indicative of a number of repetitions. In some embodiments, the one or more quality reports are a single quality report for a carrier or narrowband, and the single quality report is comprised in a MAC CE octet in which 4 bits of the MAC CE octet represent the aggregate value. In some embodiments, a remaining 4 bits of the MAC CE octet are reserved. In some embodiments, a remaining 4 bits of the MAC CE octet represent an index of the carrier or narrowband.

In some embodiments, the one or more quality reports are a single quality report that comprises a single reported value that is indicative of a number of repetitions for either a single carrier or narrowband or for a combination of two or more carriers or narrowbands. The single quality report is comprised in a MAC CE octet in which 4 bits of the MAC CE octet represent the single reported value and 1 bit of the MAC CE octet is an indication of whether the single reported value is for a single carrier or narrowband or a combination of two or more carriers or narrowbands. In some embodiments, a remaining 3 bits of the MAC CE octet are reserved.

In some embodiments, the one or more quality reports are a single quality report indicative of the number of repetitions for the one or more carriers or narrowbands encoded as a single codepoint value from a plurality of possible codepoint values, and the single codepoint value is comprised in a MAC CE octet. In some embodiments, the one or more quality reports are a single quality report that comprises a single reported value indicative of a number of repetitions that is either for a single carrier or narrowband or for a combination of two or more carriers or narrowbands. The single quality report is comprised in two MAC CE octets in which 4 bits of one of the two MAC CE octets represent the single reported value, another 4 bits of one of the two MAC CE octets represent an index of the single carrier or narrowband if the quality report is for a single carrier or narrowband, and another 1 bit of one of the two MAC CE octets is an indication of whether the single reported value is for a single carrier or narrowband or a combination of two or more carriers or narrowbands. In some embodiments, a remaining 7 bits of the two MAC CE octets are reserved.

In some embodiments, the MAC CE structure supports a fixed number of quality reports. In some embodiments, the MAC CE structure supports a variable number of quality reports. In some embodiments, the one or more quality reports are one or more quality reports for one or more carriers or narrowbands, respectively, and, for each carrier or narrowband of the one or more carriers or narrowbands, the quality report for the carrier or narrowband is comprised in a MAC CE octet in which 4 bits of the MAC CE octet represent the value that is indicative of a number of repetitions. In some embodiments, a remaining 4 bits of the MAC CE octet are reserved. In some embodiments, the one or more quality reports are one or more quality reports for one or more carriers or narrowbands, respectively, and, for each carrier or narrowband of one or more carriers or narrowbands, the quality report for the carrier or narrowband is comprised in a MAC CE octet in which 4 bits of the MAC CE octet represent the value that is indicative of the number of repetitions and a remaining 4 bits of the MAC CE octet represent an index of the carrier or narrowband.

In some embodiments, the value indicative of the number of repetitions is interpreted differently depending on a wireless device type of the wireless device. In some embodiments, the value indicative of the number of repetitions is interpreted differently depending on whether the wireless device is a Narrowband Internet of Things (NB-IoT) User Equipment (UE) or a Machine Type Communication (MTC) UE.

In some embodiments, for each carrier or narrowband of the one or more carriers or narrowbands, the quality report for the carrier or narrowband comprises information that indicates the carrier or narrowband.

In some embodiments, the uplink message is a Radio Resource Control (RRC) message. In some embodiments, the RRC message is provided in accordance with a predefined RRC message structure that supports a fixed number of quality reports. In some embodiments, the RRC message is provided in accordance with a predefined RRC message structure that supports a variable number of quality reports.

Embodiments of a method performed by a base station are also disclosed. In some embodiments, the method comprises receiving, from a wireless device, a random access preamble. The method further comprises transmitting, to the wireless device, a random access response. The method further comprises receiving, from the wireless device, a Msg3 comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level. The method further comprises utilizing the one or more quality reports.

Embodiments of a wireless device are also disclosed. In some embodiments, the wireless device is adapted to transmit, to a base station, an uplink message comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level. In some embodiments, the wireless device comprises one or more transmitters, one or more receivers, and processing circuitry associated with the one or more transmitters and the one or more receivers. The processing circuitry configured to cause the wireless device to transmit, to the base station, the uplink message comprising the one or more quality reports for the one or more carriers or narrowbands, each of the one or more quality reports comprising the at least one of the value that is indicative of the number of repetitions to be used for physical downlink control channel transmissions to the wireless device on the one or more carriers or narrowbands and the aggregation level.

Embodiments of a base station are also disclosed. In some embodiments, the base station is adapted to receive, from a wireless device, a random access preamble. The base station is further adapted to transmit, to the wireless device, a random access response. The base station is further adapted to receive, from the wireless device, a Msg3 comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level The base station is further adapted to utilize the one or more quality reports.

In some embodiments, the base station comprises processing circuitry configured to cause the base station to receive, from the wireless device, the random access preamble. The processing circuitry is further configured to cause the base station to transmit, to the wireless device, the random access response. The processing circuitry is further configured to cause the base station to receive, from the wireless device, the Msg3 comprising the one or more quality reports for the one or more carriers or narrowbands and the aggregation level. The processing circuitry is further configured to cause the base station to utilize the one or more quality reports.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
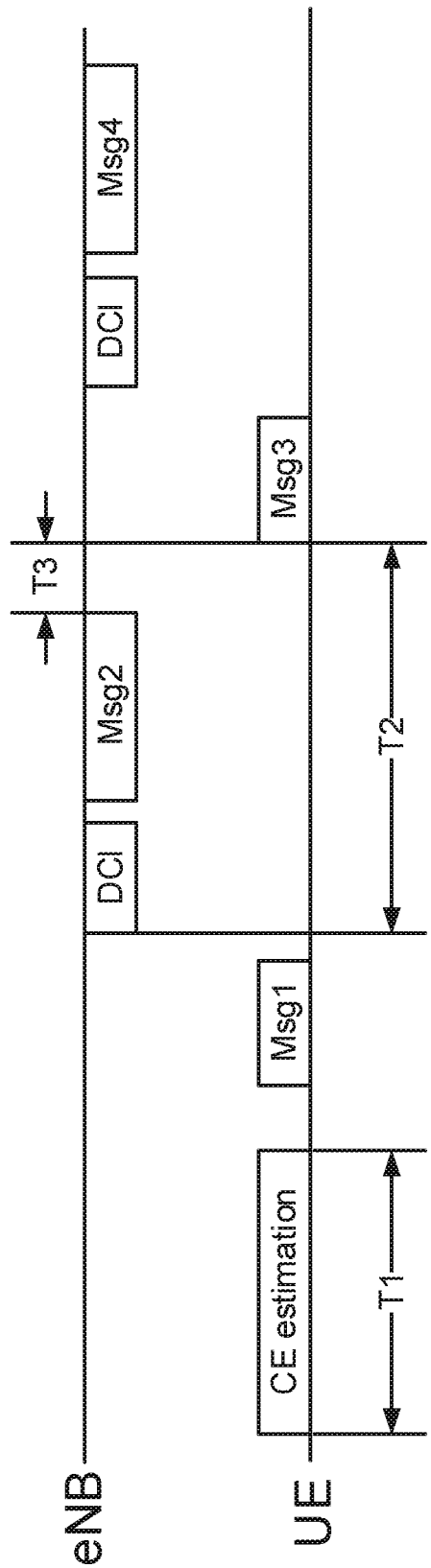
FIG. 1 illustrates definitions of time periods, T1 and T2, during a random access procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communication system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The present disclosure provides several methods to encode the required information and how it is included as an RRC message extension or as a new MAC Control Element (CE).

Certain aspects of the present disclosure and their embodiments may provide solutions to the aforementioned and/or other challenges and/or others.

In the present disclosure, solutions are presented for reporting a quality report within Msg3. Solutions are also presented for reporting a quality report in the connected mode. In both solutions, the quality report is provided in an uplink transmission from a wireless device, for example. For the connected mode, a quality report (in addition to the quality report in Msg3 or as an alternative to the quality report in Msg3) is triggered (e.g., aperiodically by the network (e.g., eNB)), where the quality report is sent via an uplink message. Further, embodiments that describe extended bits that would be used to provide the quality report are also disclosed.

Further, in some embodiments, for connected mode, the network specifies when the UE should perform the measurement and when to send the quality report (e.g., the network may configure a trigger for initiating the measurement and reporting procedure in the UE).

Certain embodiments may provide the following technical advantages. Embodiments of the present disclosure provide efficient reporting in Msg3 and during connected mode.

Figure 2:
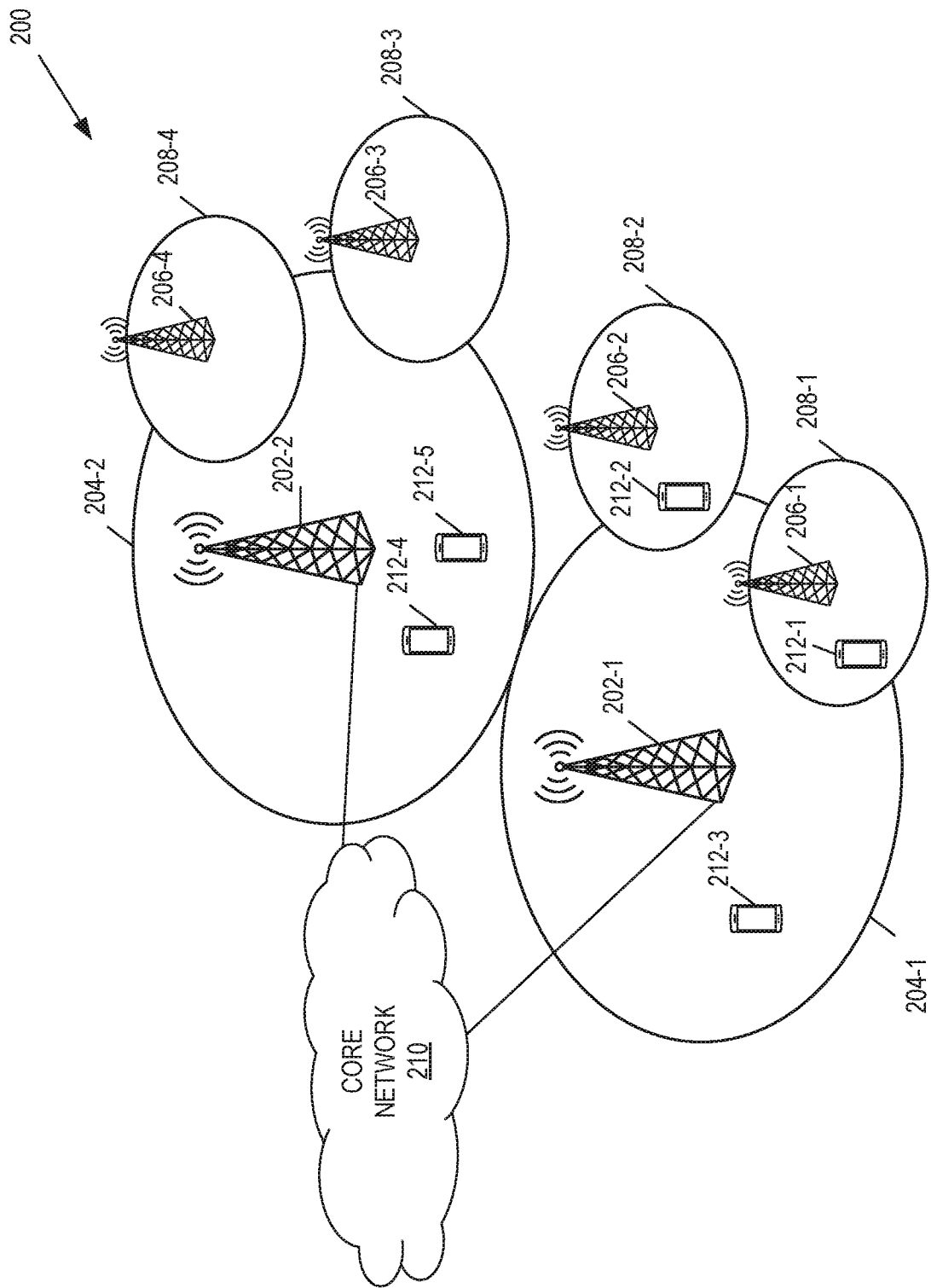
FIG. 2 illustrates one example of a cellular communication system in which embodiments of the present disclosure may be implemented.

FIG. 2 illustrates one example of a cellular communications network 200 according to some embodiments of the present disclosure. In the embodiments described herein, the cellular communications network 200 is an LTE network or a 5G NR network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
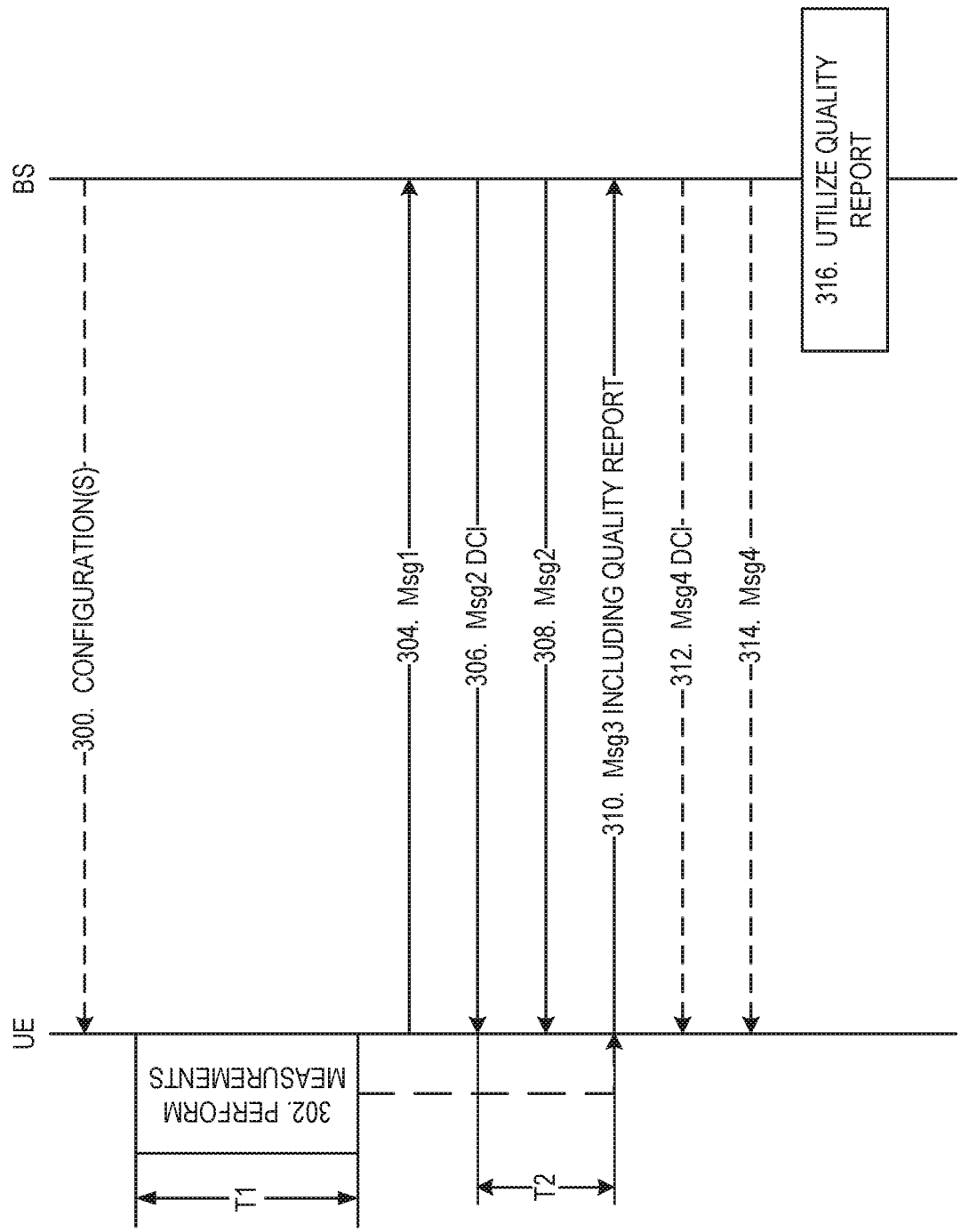
FIG. 3 is a call flow diagram that illustrates the operation of a User Equipment (UE) and a base station to enable measurements and measurement reporting by the UE during a random access procedure in accordance with some embodiments of the present disclosure.

FIG. 3 is a diagram that illustrates the operation of a UE (e.g., a wireless device 212) to provide a quality report as part of Msg3 during a random access procedure in accordance with at least some embodiments of the present disclosure. Optional steps are represented with dashed lines. Notably, the UE is preferably a NB-IoT UE or a MTC UE. As illustrated, the base station (e.g., eNB or gNB) optionally transmits one or more configurations to the UE (step 300). The configuration(s) may include a configuration of a trigger to be used at the UE to trigger measurement and reporting of a quality report in Msg3 as described herein.

In this example, the UE performs measurements (step 302). The measurements can be any type of measurements needed for the desired quality report. Further, the measurements include measurements on an anchor carrier of the UE and/or measurements on one or more non-anchor carriers of the UE. In this example, the UE performs the measurements during T1 (i.e., a time interval prior to transmission of Msg1) and, optionally, during T2 (i.e., the time interval between the start of reception of the Msg2 DCI at the UE and the transmission of Msg3 by the UE), but the performance of the measurements is not limited to T1 and/or T2. The UE may perform the measurements during T1, during T2, during both T1 and T2, or during any appropriate time interval(s) prior to sending the quality report in Msg3. In some embodiments, the UE begins performing the measurements in response to a triggering event, which, as described above, may have been configured by the network (e.g., by the base station).

The UE transmits Msg1 (i.e., a random access preamble) (step 304). Upon detecting the Msg1 transmission from the UE, the base station transmits Msg2 DCI, which includes information scheduling the UE for the downlink transmission of Msg2 (i.e., the random access response) (step 306). The base station transmits Msg2 in accordance with the Msg2 DCI (step 308).

The UE transmits a Msg3 including a quality report (step 310). In this example, the quality report is information that is based on the measurements (or at least some of the measurements) (e.g., derived from the measurements or at least some of the measurements) performed by the UE in step 302 and/or includes the measurements (or at least some of the measurements) performed by the UE in step 302. Note that, below, various embodiments are disclosed for how the quality report can be formatted within the Msg3 transmission. Any of those reporting formats can be used.

Optionally, the random access procedure continues by the base station transmitting both Msg4 DCI and the corresponding Msg4 to the UE (steps 312 and 314).

The base station then utilizes the quality report (step 316). For example, the base station may utilize the quality report to perform Msg4 DCI link adaptation, to set the MPDCCH USS, to determine the number of repetitions to be used for MPDCCH and/or PDSCH, or the like. Note that while step 316 is illustrated as occurring after step 314, the present disclosure is not limited thereto. The base station may utilize the quality report any time after receiving the quality report in the Msg3 transmission from the UE in step 310.

Note that while FIG. 3 illustrates an embodiment in which the UE sends the quality report in Msg3 (i.e., when in IDLE mode), the present disclosure is not limited thereto. The UE may additionally or alternatively send the quality report in an uplink message when in CONNECTED mode. In this case, the sending of the quality report in the uplink message may be triggered, e.g., by the network (e.g., by the base station), e.g., aperiodically.

Now, the discussion will turn to a number of embodiments of a reporting format that can be used when reporting the quality report in Msg3.

1.1 Report Format

A BL/CE UE might perform measurements in more than one narrowband. Therefore, it is possible to report only one narrowband, multiple narrowbands, or an aggregated value taking into account multiple narrowbands. The possibility of taking multiple measurements and the selection of the set of narrowbands that should be measured is out of the scope of the present disclosure. It is assumed that all the possibilities are viable.

In 3GPP, a "narrowband" is defined as six non-overlapping consecutive physical resource blocks in the frequency domain. Narrowbands are introduced in eMTC to support the reduced UE bandwidth. Narrowbands are predefined and contiguous. In particular:

a. all narrowbands are of a size of 6 PRBs,
b. narrowbands are non-overlapping, and
c. the center PRB (in 3, 5, 15, 20 MHz) of the system bandwidth and the remaining PRBs at the edges of the system bandwidth are not included in any narrowband.

The eNB may choose to schedule transmissions across narrowbands to attain better coverage and signal quality for all the UEs being served. However, the same UE is not expected to be transmitting or receiving on more than one narrowband or across multiple narrowbands at any given time.

A NB-IoT UE can decide to perform the random access procedure on either the anchor or any non-anchor carrier. Once the decision has been made, the whole communication will be performed on the same carrier. In any case, the decision is made once the random access procedure is trigged after T1. Therefore, a measurement on the right carrier can be performed only during T2, but multiple measurements can be performed during T1 on the other carriers, so their values could be reported in Msg3 similarly to the eMTC case.

The transmission of a new MAC CE requires the definition of a new LCID regardless of the chosen embodiment. It will be included in the corresponding MAC PDU subheader. As it is clear from Table 6.2.1-2 in [1] there are many LCIDs which are currently reserved and may be used for this new MAC CE, for instance "10001".

In case of an RRC message extension, the report may be included in the UL-CCCH RRC messages (RRCConnectionRequest, RRCConnectionReestablishmentRequest, RRCConnectionResumeRequest, or RRCEarlyDataRequest) or a new dedicated RRC message (on UL-CCCH or UL-DCCH) may be added for quality reporting in connected mode and/or in idle mode.

In the remainder of this section, several ways of encoding a single narrowband measurement are described as different embodiments of the present disclosure. Next, it is described how both a MAC CE is built or an RRC message extended considering both the case of a single measurement report and multiple measurement reports as further embodiments.

1.1.1 Single Measurement Report Encoding

This section defines the encoding format for a single measurement regardless of whether it will be used in a MAC CE or RRC message. ASN.1 definitions are provided as well for later use.

1.1.1.1 Measurement Only

In one embodiment, it is stated that the report is encoded using 4 bits including the possible numbers of repetitions and the "noMeasurement" codepoint. Table 1 reports a possible way to encode the possible code points for these 4 bits.

TABLE 1 dl-MeasReport values definition

| dl-MeasReport field | Meaning (eMTC) | Meaning (NB-IoT) |
|---|---|---|
| 0000 | 1 repetition | 1 repetition |
| 0001 | 2 repetitions | 2 repetitions |
| 0010 | 4 repetitions | 4 repetitions |
| 0011 | 8 repetitions | 8 repetitions |
| ... | ... | ... |
| 0111 | 128 repetitions | 128 repetitions |
| 1000 | 256 repetitions | 256 repetitions |
| 1001 | Reserved | 512 repetitions |
| 1010 | Reserved | 1024 repetitions |
| 1011 | Reserved | 2048 repetitions |
| 1100-1110 | Reserved | Reserved |
| 1111 | No measurement | No measurement |

```
Repetitions-eMTC ::=    ENUMERATED {
   noMeasurements, candidateRep-A, candidateRep-B,
candidateRep-C, candidateRep-D, candidateRep-E, candidateRep-F,
candidateRep-G, candidateRep-H, candidateRep-I, spare6, spare5,
spare4, spare3, spare2, spare1
}
Repetitions-NB-IoT ::=    ENUMERATED {
   noMeasurements, candidateRep-A, candidateRep-B,
candidateRep-C, candidateRep-D, candidateRep-E, candidateRep-F,
candidateRep-G, candidateRep-H, candidateRep-I, candidateRep-J,
candidateRep-K, candidateRep-L, spare3, spare2, spare1
}
```

From now on, we denote as "Repetitions" either one of the two aforementioned Information Elements. Depending on the technology (eMTC or NB-IoT), the correct one should be considered.

The resulting report format has the following structure:

```
ReportValueOnly ::=    SEQUENCE {
reportValue     Repetitions
}
```

1.1.1.2 Measurement and Narrowband/Carrier Index

In another embodiment, every report is composed of a 4-bit field representing the measurement value as described in Section 1.1.1.1, and another 4-bit field representing the narrowband or carrier index to which the measurement refers for eMTC or NB-IoT. For both technologies there are at most 16 different possibilities of narrowband/carrier indexes, therefore, 4 bits are sufficient.

```
ReportValueIdx ::=    SEQUENCE {
  reportValue     Repetitions,
  NB-C-Index      INTEGER (0..15)
}
```

1.1.1.3 Aggregated Measurement

In another embodiment, every report is composed of a 4 bit field representing the measurement value as described in Section 1.1.1.1, and a 1 bit field (denoted in the remainder of the present disclosure as "A") stating if the value is an aggregated metric based on several measurements or refers to a single measurement. An aggregation function can be predefined between a network and a UE, for example, based on averaging of the measurements, or a maximum value among measurements. In case A is set, the network is implicitly informed on how the metric was calculated, and it does not need further information. In case A is not set, then the network implicitly knows to which narrowband/carrier the measurement referred, or how to interpret the data.

```
ReportValueAggregate ::=   SEQUENCE {
  reportValue     Repetitions,
  isAggregate     ENUMERATED {true}   OPTIONAL
}
```

1.1.1.4 Codepoint List

In another embodiment, all the possible combinations of reported values, narrowband/carrier indexes, and aggregation indications are encoded as a list of codepoints using the minimum number of bits possible.

In general, the number of possible combinations is computed as $N_{rep} \times N_{idx} + N_{rep} + 1$ where $N_{rep}$ is the number possible reported values (i.e., absolute value of repetitions) and $N_{idx}$ is the number of possible narrowband/carrier indexes, i.e., 16 for both eMTC and NB-IoT. The three terms in the equation represent respectively the possible combinations of reported values, narrowband/carrier indexes, codepoints representing an aggregated reported value, and the "noMeasurement" codepoint. For eMTC $N_{rep}=9$, whereas for NB-IoT $N_{rep}=12$.

The resulting total number of codepoints to be encoded is $9 \times 16 + 9 + 1 = 154$ for eMTC and $12 \times 16 + 12 + 1 = 205$ for NB-IoT, which means that 8 bits are sufficient for both eMTC and NB-IoT.

```
ReportCodePoints-eMTC ::=   ENUMERATED {
  noMeasurement,
  r1-NB0, r2-NB0, r4-NB0, r8-NB0, . . ., r256-NB0,
  r1-NB1, r2-NB0, . . ., r256-NB15,
  r1-Aggregate, r2-Aggregate, . . ., r256-Aggregate,
  spare102, spare101, spare100, . . ., spare1
}
ReportCodePoints-NB-IoT ::=   ENUMERATED {
  noMeasurement,
  r1-NB0, r2-NB0, r4-NB0, r8-NB0, . . ., r2048-NB0,
  r1-NB1, r2-NB0, . . ., r2048-NB15,
  r1-Aggregate, r2-Aggregate, . . ., r2048-Aggregate,
  spare51, spare50, spare49, . . ., spare1
}
```

From now on, we denote as "ReportCodePoints" either one of the two aforementioned Information Elements. Depending on the technology the correct one should be considered.

1.1.1.5 All Fields

In another embodiment, every report is composed of a 4-bit field representing the measurement value as described in Section 1.1.1.1, a 4-bit field representing the narrowband or carrier index to which the measurement refers for respectively eMTC or NB-IoT, and a 1-bit field "A" as described in Section 1.1.1.3. The total length of the report data block is, then, 9 bits.

```
ReportAllFields ::=    SEQUENCE {
  reportValue     Repetitions,
  NB-C-Index      INTEGER (0..15),
  isAggregate     ENUMERATED {true}   OPTIONAL
}
```

1.1.2 MAC CE Structure

As already mentioned, the measurement data included in the uplink message (Msg3) may be composed of a single report or of multiple reports referring to different narrowbands/carriers.

1.1.2.1 Single Value Report

In one embodiment, it is stated that only one report is sent. In this case, the MAC CE is composed by a fixed number of octets and the R/F2/E/LCID MAC PDU subheader is used. Depending on the format used to encode the report, the length of the MAC CE can change. If the encoding described in Sections 1.1.1.1, 1.1.1.2, 1.1.1.3, or 1.1.1.4 is used, then the MAC CE is one octet long. If the encoding described in Section 1.1.1.5 is used, then the MAC CE is two octets long.

Since the MAC CE should be octet-aligned, all the unused bits needed to reach the closest larger length are reserved.

Figure 4:
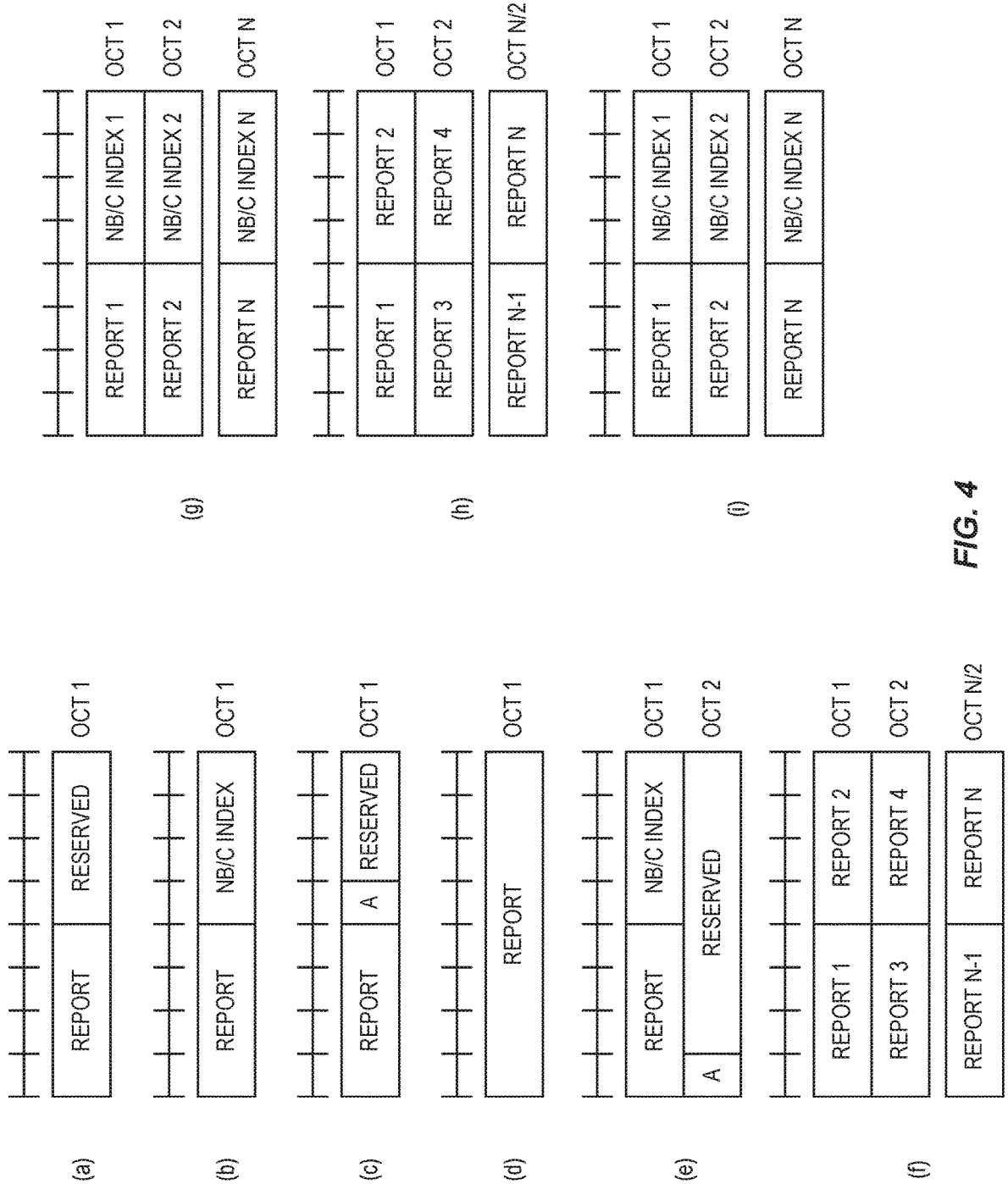
FIG. 4 illustrates examples of formats of quality reports according to some embodiments of the present disclosure.

- In case the encoding of Section 1.1.1.1 is used, 4 bits are reserved as illustrated in FIG. 4, (a).
- In case the encoding of Section 1.1.1.2 is used, 0 bits are reserved as illustrated in FIG. 4, (b).
- In case the encoding of Section 1.1.1.3 is used, 3 bits are reserved as illustrated in FIG. 4, (c).
- In case the encoding of Section 1.1.1.4 is used, 1 bit is reserved for eMTC and 0 bits are reserved for NB-IoT. If both technologies use 8 bits, 0 bits are reserved, as illustrated in FIG. 4, (d).
- In case the encoding of Section 1.1.1.5 is used, 7 bits are reserved, as illustrated in FIG. 4, (e).

1.1.2.2 Fixed Multiple Values Report

In an alternate embodiment, a fixed number of reports (N) is included in the MAC CE.

In this case, the length of the MAC CE is fixed, therefore, the R/F2/E/LCID MAC PDU subheader is used.

The encoding schemes of Sections 1.1.1.3, 1.1.1.4, and 1.1.1.5 consider the possibility of transmitting an aggregate measurement. In such a case, that would be the only measurement transmitted; therefore, those three encodings are not applicable to this embodiment.

In case the encoding of Section 1.1.1.1 is used, the length of the MAC CL is $$\left\lceil \frac{N}{2} \right\rceil,$$

and 4 reserved bits are added at its end if N is odd. In this case, each nibble refers to a specific narrowband or carrier measurement or has a specific meaning that is known by the eNB without the need of further signaling. Note that, in some embodiments, narrowband measurements are used for eMTC, and carrier measurements are used for NB-IoT. Thus, in some embodiments, the 4 bits are a narrowband index for eMTC or a carrier index for NB-IoT. The total number of octets occupied by the MAC CE in the MAC PDU is $$\left\lceil \frac{N}{2} \right\rceil + 1.$$

An example is illustrated in FIG. 4, (f).

In case the encoding of Section 1.1.1.2 is used, each octet refers to a specific narrowband/carrier that is not known in advance by the eNB and can change at every transmission of the report. The length of the MAC CE is N and the total number of octets occupied by the MAC CE in the MAC PDU is N+1. An example is illustrated in FIG. 4, (g).

1.1.2.3 Variable Multiple Values Report

In an alternate embodiment, a variable number of reports (N) is included in the MAC CE.

In this case, the length of the MAC CE is variable as well; therefore, the L field in the MAC PDU subheader is included. In the worst case, L=32; therefore, the total length of the MAC subheader is 16 bits. In case the MAC CE is the last SDU included in a MAC PDU with no padding, the subheader is 8 bits long. For simplicity, we ignore the latter case.

The encoding schemes of Sections 1.1.1.3, 1.1.1.4, and 1.1.1.5 consider the possibility of transmitting an aggregate measurement. In such a case, that would be the only measurement transmitted; therefore, these two encodings are not applicable to this embodiment.

In case the encoding of Section 1.1.1.1 is used, the length or the MAC CE is $$\left\lceil \frac{N}{2} \right\rceil,$$

and 4 reserved bits are added at its end if N is odd. In this case, each nibble refers to a specific narrowband/carrier measurement or has a specific meaning that is known by the eNB without the need of further signaling. The total number of octets occupied by the MAC CE in the MAC PDU is $$\left\lceil \frac{N}{2} \right\rceil + 2.$$

An example is illustrated in FIG. 4, (h).

In case the encoding of Section 1.1.1.2 is used, each octet refers to a specific narrowband/carrier that is not known in advance by the eNB and can change at every transmission of the report. The length of the MAC CE is N and the total amount of octets occupied by the MAC CE in the MAC PDU is N+2. An example is illustrated in FIG. 4, (i).

1.1.3 RRC Message Extension

Similar to MAC CE based reporting described in Section 1.1.2, the measurement report may include a single or multiple report records.

1.1.3.1 Single Value Report

In one embodiment, only a single report value is sent. Depending on the format used to encode the report, the length of the RRC Message can change, usually by the amount mentioned in the corresponding sections. In case of a single value report, the aforementioned Information Elements are included as they are in the ASN.1 definition of the existing RRC message or in a new RRC message.

In an alternate embodiment, spare bits are added to the RRC message to reach a size such that the waste of bits and resources is minimized (e.g., byte alignment, specific Transport Block (TB) size, . . . ).

In an alternate embodiment, the existing spare bits are replaced by the report Information Element to maintain the same TB size.

1.1.3.2 Fixed Multiple Values Report

In an alternate embodiment a fixed number of reports (N) is included in the message.

ReportNumber::=INTEGER::=N

The number of reports (N) can be predefined, e.g., 1, 2, 4, or configured and reconfigurable. In the latter case, N can be (re)configured by network using a common signaling (e.g., via SIB) or indicated by the UE using a dedicated signaling mechanism (e.g., UEInformationTransfer) or during initial attach procedure.

The encoding schemes of Sections 1.1.1.3, 1.1.1.4, and 1.1.1.5 consider the possibility of transmitting an aggregate measurement. In such case, that would be the only measurement transmitted; therefore, these two encodings are not applicable to this embodiment.

Denoting as "ReportX" each of the ASN.1 report formats shown in Section 1.1.1, the following ASN.1 code is included in an existing message or in a new message.

qualityReport::=SEQUENCE (SIZE(ReportNumber)) OF ReportX 1.1.3.3 Variable Multiple Values Report In an alternate embodiment, a variable number of reports is included in the message. The maximum number of reports (maxReportNumber) is equal to the number of narrowbands or carriers in the system.

The encoding schemes of Sections 1.1.1.3, 1.1.1.4, and 1.1.1.5 consider the possibility of transmitting an aggregate measurement. In such a case, that would be the only measurement transmitted; therefore, these two encodings are not applicable to this embodiment.

Denoting as "ReportX" each of the ASN.1 report formats shown in Section 1.1.1, the following ASN.1 code is included in an existing message or in a new message.

qualityReport::=SEQUENCE (SIZE(1 . . . maxReportNumber)) OF ReportX 1.2 Report (Re)Configuration In an embodiment, the type of reporting mechanism, i.e., single or multiple values, aggregated value or not, with or without narrowband/carrier index, can be (re)configured by the network (e.g., by the base station) via common or dedicated signaling. This is applicable irrespective of the signaling mechanism for reporting, i.e., either via a MAC CE or RRC signaling.

1.3 Additional Aspects

In a general embodiment, the concepts presented in Sections 1.1 and 1.2 are applicable to the case where the quality report in Msg3 contains other measurement information such as the aggregation level for MPDCCH rather than or in addition to the information about repetition number. In this case, the report formats with a similar structure but different bit sizes can be used.

In some examples, in an RRC message extension, the quality report could be implemented with 4 bits as follows:

```
CQI-MPDCCH-r16 ::=ENUMERATED {noMeasurements,
candidateRep-A, candidateRep-B, candidateRep-C, candidateRep-D,
candidateRep-E, candidateRep-F, candidateRep-G, candidateRep-H,
candidateRep-I, spare6, spare5, spare4, spare3, spare2, spare1}
```

Instead of reusing the existing indication for NB-IoT, a new report adaptable to a different range of values and different options may be implemented.

The total size of the RRC messages transmitted in UL-CCCH can be increased by 16 bits, meaning that RRCConnectionRequest, RRCConnectionResumeRequest with truncated resume ID, and RRCConnectionReestablishmentRequest can be 64 bits long, while RRCConnectionResumeRequest with full resume ID is 80 bits.

The following are examples of message extensions according to these requirements:

```
UL-CCCH-MessageType ::= CHOICE {
    c1              CHOICE {
        rrcConnectionReestablishmentRequest
            RRCConnectionReestablishmentRequest,
        rrcConnectionRequest        RRCConnectionRequest },
    messageClassExtension   CHOICE {
        c2      CHOICE {
            rrcConnectionResumeRequest-r13
                RRCConnectionResumeRequest-r13},
            messageClassExtensionFuture-r13     CHOICE {
                c3          CHOICE {
                    rrcEarlyDataRequest-r15
                        RRCEarlyDataRequest-r15,
                    rrcConnectionResumeRequest-r16
                        RRCConnectionResumeRequest-r16,
                    rrcEarlyDataRequest-r16
                        RRCEarlyDataRequest-r16,
                    spare1      NULL},
                messageClassExtensionFuture-r15
    SEQUENCE { }
                    } } }
RRCConnectionRequest ::=SEQUENCE {
    criticalExtensions              CHOICE {
        rrcConnectionRequest-r8             RRCConnectionRequest-r8-IEs,
        criticalExtensionsFuture    CHOICE          {
            rrcConnectionRequest-r16            RRCConnectionRequest-r16-IEs,
            criticalExtensionsFuture                    SEQUENCE { }
                        }   }   }
RRCConnectionRequest-r16-IEs ::= SEQUENCE {
    ue-Identity                             InitialUE-Identity,
    establishmentCause                      EstablishmentCause,
    d1-MeasurementReport                    CQI-MPDCCH-r16,
    spare                                   BIT STRING (SIZE (12) ) }
RRCConnectionResumeRequest-r16 ::= SEQUENCE {
    criticalExtensions              CHOICE {
        rrcConnectionResumeRequest-r16
        RRCConnectionResumeRequest-r16-IEs,
        spare1 NULL                         } }
RRCConnectionResumeRequest-r16-IEs ::=      SEQUENCE {
    resumeIdentity-r13                      CHOICE{
        resumeID-r13                        ResumeIdentity-r13,
        truncatedResumeID-r13               BIT STRING (SIZE (24) )
    },
    shortResumeMAC-I-r13                    BIT STRING (SIZE (16) ),
    resumeCause-r13                         ResumeCause,
    d1-MeasurementReport                    CQI-MPDCCH-r16,
    spare                                   BIT STRING (SIZE (10) )
}
RRCConnectionReestablishmentRequest ::= SEQUENCE {
    criticalExtensions              CHOICE {
        rrcConnectionReestablishmentRequest-r8
            RRCConnectionReestablishmentRequest-r8-IEs,
        criticalExtensionsFuture            CHOICE {
            rrcConnectionReestablishmentRequest-r16
                RRCConnectionReestablishmentRequest-r16-IEs,
            criticalExtensionsFuture            SEQUENCE { } }}}
RRCConnectionReestablishmentRequest-r16-IEs ::= SEQUENCE {
    ue-Identity                             ReestabUE-Identity,
    reestablishmentCause                    ReestablishmentCause,
    d1-MeasurementReport                    CQI-MPDCCH-r16,
    spare                                   BIT STRING (SIZE (13) )
}
```

Table 2 summarizes the sizes of the above RRC messages and the minimum TBS required for their transmission.

TABLE 2

Sizes in bits of non-EDT RRC extended messages

| | RRC | Available spare bits | RRC (total) | Min TBS |
|---|---|---|---|---|
| Connection Request | 52 | 12 | 64 | 72 |
| Connection Resume Request (resume ID) | 70 | 10 | 80 | 88 |
| Connection Resume Request (TruncatedResume ID) | 54 | 10 | 64 | 72 |
| Connection Reestablishment Request | 51 | 13 | 64 | 72 |

For EDT, the legacy RRCEarlyDataRequest message has an undefined length and it contains a byte-aligned dedicatedInfoNAS field. In this case, shown below, the new field dl-MeasurementReport can be included knowing that an appropriate TBS should be granted. In order to maintain the alignment of dedicatedInfoNAS, 4 spare bits can be added between dl-MeasurementReport and dedicatedInfoNAS-r15.

```
RRCEarlyDataRequest-r16 ::=    SEQUENCE {
    criticalExtensions          CHOICE {
        rrcEarlyDataRequest-r16
        RRCEarlyDataRequest-r16-IEs,
        criticalExtensionsFuture   SEQUENCE { }
    }
}
RRCEarlyDataRequest-r16-IEs ::=  SEQUENCE {
    s-TMSI-r15                  S-TMSI,
    establishmentCause-r15      ENUMERATED { mo-
Data-r15, delayTolerantAccess-r15},
    dl-MeasurementReport        CQI-MPDCCH-r16,
    dedicatedInfoNAS-r15        DedicatedInfoNAS,
    nonCriticalExtension        SEQUENCE { }
        OPTIONAL
}
```

For a new MAC CE, a new LCID is included in the corresponding R/F2/E/LCID MAC subheader. "10001" can be chosen for this scope, so Table 6.2.1-2 in [8] can be modified as follows.

| Codepoint/Index | LCID values |
|---|---|
| 00000 | CCCH |
| 00001-01010 | Identity of the logical channel |
| 01011 | CCCH |
| 01100 | CCCH |
| 01101 | CCCH and Extended Power Headroom Report |
| 01110-01111 | Reserved |
| 10000 | Extended logical channel ID field |
| 10001 | DL Quality Report |
| 10010 | AUL confirmation (4 octets) |
| 10011 | AUL confirmation (1 octet) |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Provided that the UL Grant for Msg3 is large enough, the MAC entity should multiplex this MAC CE with any other message transmitted in the same MAC PDU. The overhead introduced by this MAC CE is 16 bits, 8 for the additional MAC Subheader, and 8 for the MAC CE itself.

In Rel.14, for NB-IoT UEs, the RRC messages transmitted in UL-CCCH have been extended using solely the spare bits available at that time. This means that if MAC CE is used for a non-anchor carrier measuring in NB-IoT, both as a replacement of the legacy indication or as an additional one, the minimum TBS for Msg3 should be increased by at least 16 bits. For eMTC, the same is true, but also in case of RRC extension, it is required to extend the minimum TBS for Msg3. As it was already mentioned there are not enough spare bits in legacy messages to implement the new indication.

For eMTC, both MAC CE and RRC extension based solutions require an extension of the minimum TBS.

The legacy RRC messages have been dimensioned to generate a MAC PDU fitting exactly a TBS size of 72 bits for RRCConnectionResumeRequest with full resume ID and 56 bits for all the other ones.

In principle, the messages may be extended only by the few necessary bits, but the next smallest TBS sizes available according to Table 3 and Table 4, with respect to the legacy RRC messages, are 88 and 72 bits, which are 16 bits larger than the aforementioned legacy sizes. An RRC message extended by less than 16 bits would lead to a MAC PDU with padding bits which cannot be used. Implementing a 16 bit extension of the RRC messages allows more spare bits to be available for future non-critical extensions.

TABLE 3

TBS table for Msg3 in CE mode

| | $N_{PRB}$ | | | |
|---|---|---|---|---|
| $I_{MCS}$ | 1 | 2 | 3 | 6 |
| 0 | 16 | 32 | 56 | 152 |
| 1 | 24 | 56 | 88 | 208 |
| 2 | 32 | 72 | 144 | 256 |
| 3 | 40 | 104 | 176 | 328 |
| 4 | 56 | 120 | 208 | 408 |
| 5 | 72 | 144 | 224 | 504 |
| 6 | 328 | 176 | 256 | 600 |
| 7 | 104 | 224 | 328 | 712 |

TABLE 4

TBS table for Msg 3 in CE mode B

| $I_{TBS}$ | $N_{PRB}$ | |
|---|---|---|
| | 1 | 2 |
| 0 | 56 | 152 |
| 1 | 88 | 208 |
| 2 | 144 | 256 |

Nevertheless, usually the eNB is configured to provide a larger TBS than the one strictly required. In those cases, the increase of the MAC PDU size, both in the case of RRC extension and MAC CE implementation, does not have any impact to the actual amount of resources occupied on the channel, or on the energy consumption of the device as the UE would have to transmit padding bits in any case.

Figure 5:
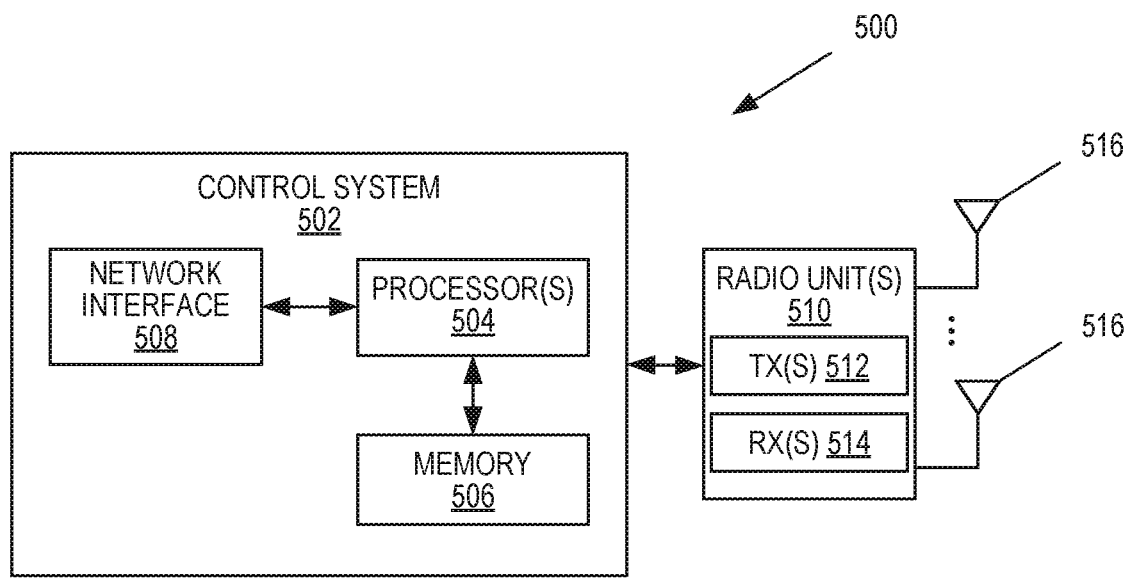
FIGS. 5 through 7 are schematic block diagrams of example embodiments of a radio access node (e.g., a base station)

Now, the discussion turns to some aspects regarding various example embodiments of nodes and systems in which embodiments of the present disclosure may be implemented. The following discussion is applicable all of the embodiments, variations, and aspects of the present disclosure described above. FIG. 5 is a schematic block diagram of a radio access node 500 according to some embodiments of the present disclosure. The radio access node 500 may be, for example, a base station 202 or 206. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 includes one or more radio units 510 that each include one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a radio access node 500 as described herein. In some embodiments, the function(s) are implemented in software that is stored, e.g., in the memory 506 and executed by the one or more processors 504.

Figure 6:
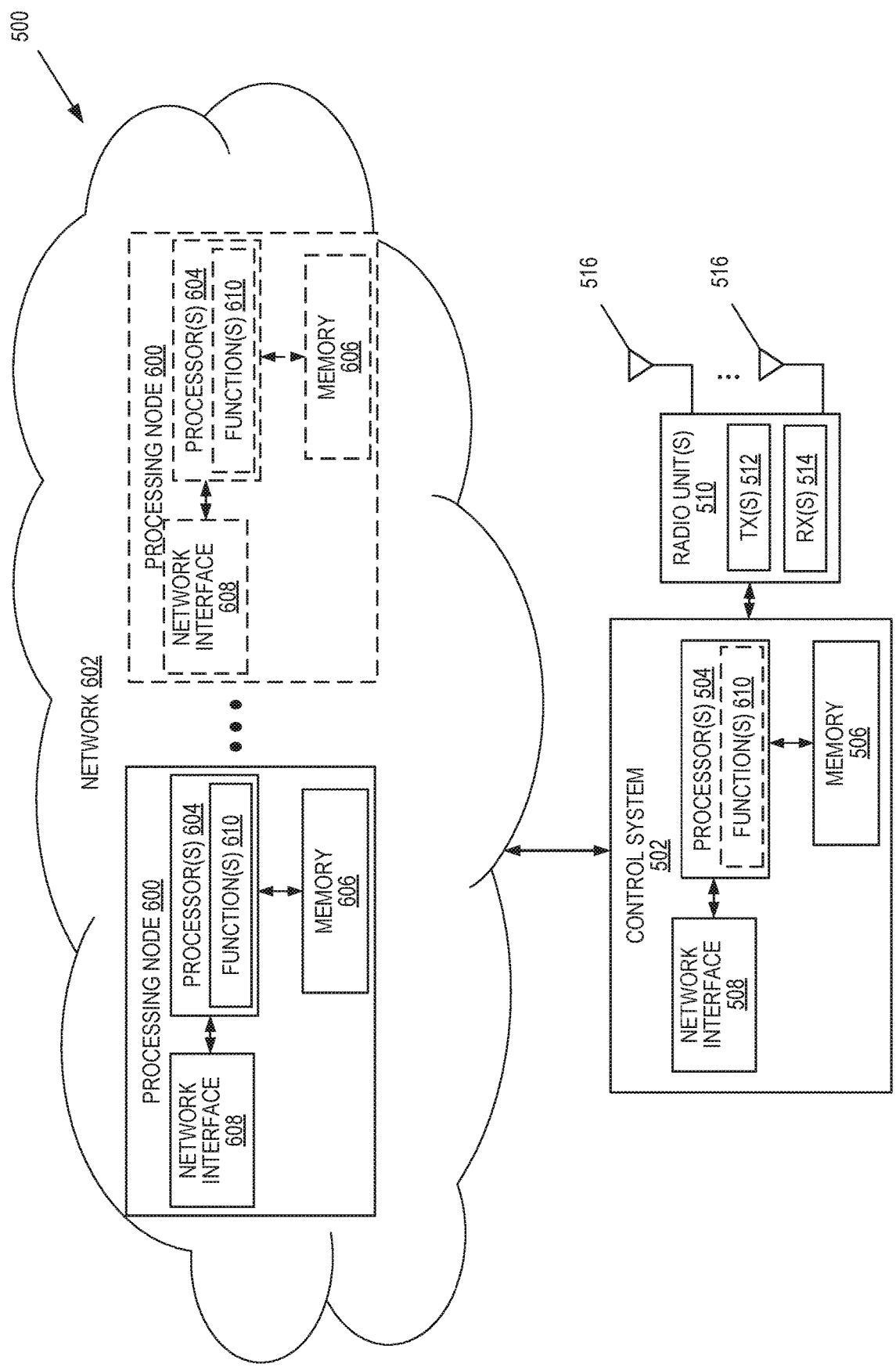

FIG. 6 is a schematic block diagram that illustrates a virtualized embodiment of the radio access node 500 according to some embodiments of the present disclosure. This discussion is equally applicable to other types of network nodes. Further, other types of network nodes may have similar virtualized architectures.

As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 includes the control system 502 that includes the one or more processors 504 (e.g., CPUs, ASICs, FPGAs, and/or the like), the memory 506, and the network interface 508 and the one or more radio units 510 that each include the one or more transmitters 512 and the one or more receivers 514 coupled to the one or more antennas 516, as described above. The control system 502 is connected to the radio unit(s) 510 via, for example, an optical cable or the like. The control system 502 is connected to one or more processing nodes 600 coupled to or included as part of a network(s) 602 via the network interface 508. Each processing node 600 includes one or more processors 604 (e.g., CPUs, ASICs, FPGAs, and/or the like), memory 606, and a network interface 608.

In this example, functions 610 of the radio access node 500 described herein are implemented at the one or more processing nodes 600 or distributed across the control system 502 and the one or more processing nodes 600 in any desired manner. In some particular embodiments, some or all of the functions 610 of the radio access node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicates directly with the processing node(s) 600 via an appropriate network interface(s).

In some embodiments, a computer program including instructions which, when executed by at least one processor, causes the at least one processor to carry out the functionality of radio access node 500 or a node (e.g., a processing node 600) implementing one or more of the functions 610 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
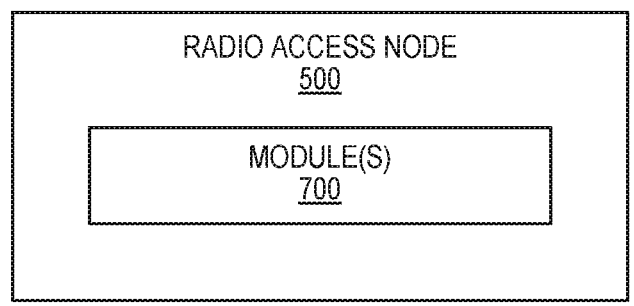

FIG. 7 is a schematic block diagram of the radio access node 500 according to some other embodiments of the present disclosure. The radio access node 500 includes one or more modules 700, each of which is implemented in software. The module(s) 700 provide the functionality of the radio access node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
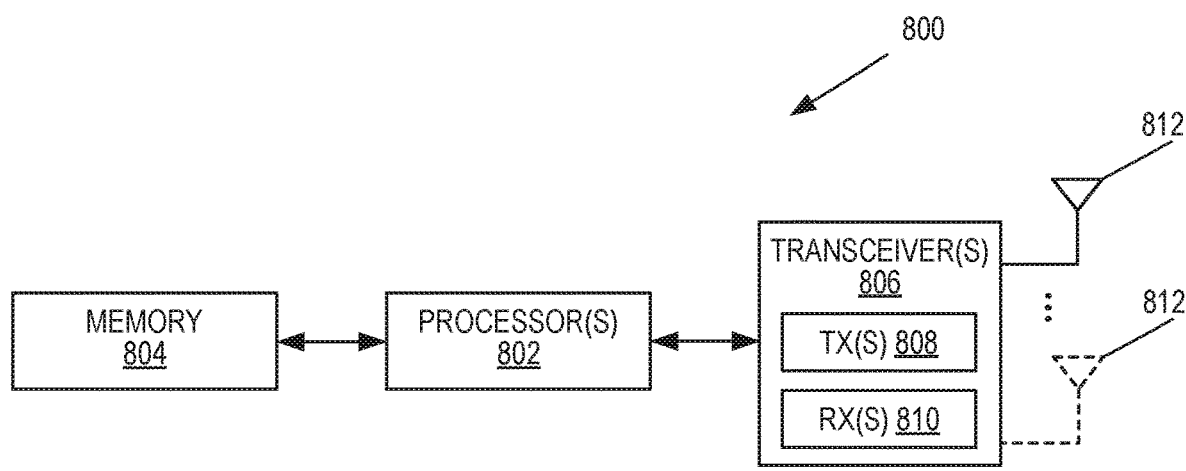
FIGS. 8 and 9 are schematic block diagrams of example embodiments of a wireless device (e.g., a UE)

FIG. 8 is a schematic block diagram of a UE 800 according to some embodiments of the present disclosure. As illustrated, the UE 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by one of ordinary skill in the art. The processors 802 are also referred to herein as processing circuitry. The transceivers 806 are also referred to herein as radio interface circuitry. In some embodiments, the functionality of the UE 800 described above may be fully or partially implemented in software that is, e.g., stored in the memory 804 and executed by the processor(s) 802. Note that the UE 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the UE 800 and/or allowing output of information from the UE 800), a power supply (e.g., a battery and associated power circuitry), etc.

In some embodiments, a computer program including instructions which, when executed by at least one processor, causes the at least one processor to carry out the functionality of the UE 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
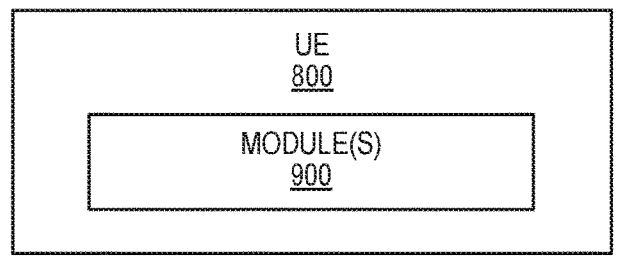

FIG. 9 is a schematic block diagram of the UE 800 according to some other embodiments of the present disclosure. The UE 800 includes one or more modules 900, each of which is implemented in software. The module(s) 900 provide the functionality of the UE 800 described herein.

Figure 10:
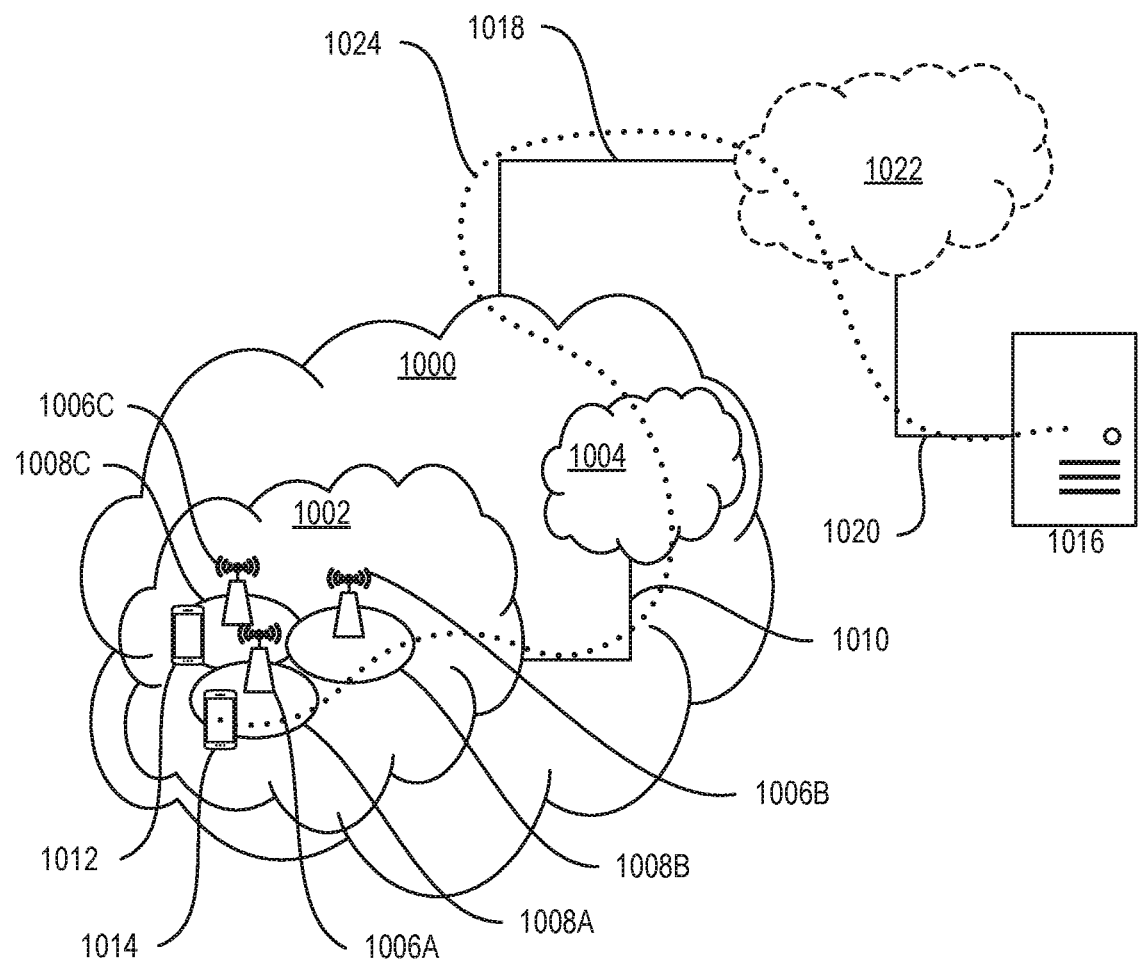
FIG. 10 illustrates an example communication system in which embodiments of the present disclosure may be implemented.

With reference to FIG. 10, in accordance with an embodiment, a communication system includes a telecommunication network 1000, such as a 3GPP-type cellular network, which comprises an access network 1002, such as a RAN, and a core network 1004. The access network 1002 comprises a plurality of base stations 1006A, 1006B, 1006C, such as NBs, eNBs, gNBs, or other types of wireless Access Points (APs), each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of uplink and downlink communications. For example, the base station 1006 may not or need not be informed about the past routing of an incoming downlink communication with data originating from the host computer 1016 to be forwarded (e.g., handed over) to a connected UE 1012. Similarly, the base station 1006 need not be aware of the future routing of an outgoing uplink communication originating from the UE 1012 towards the host computer 1016.

Example implementations, in accordance with an embodiment, of the UE, base station, and host computer discussed in the preceding paragraphs will now be described with reference to FIG. 11. In a communication system 1100, a host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a base station 1118 provided in a telecommunication system and comprising hardware 1120 enabling it to communicate with the host computer 1102 and with the UE 1114. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the base station 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the base station 1118 further includes processing circuitry 1130, which may comprise one or more programmable processors, ASICs, FPGAs, or combinations of these (not shown) adapted to execute instructions. The base station 1118 further has software 1132 stored internally or accessible via an external connection.

The communication system 1100 further includes the UE 1114 already referred to. The UE's 1114 hardware 1134 may include a radio interface 1136 configured to set up and maintain a wireless connection 1126 with a base station serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

Figure 11:
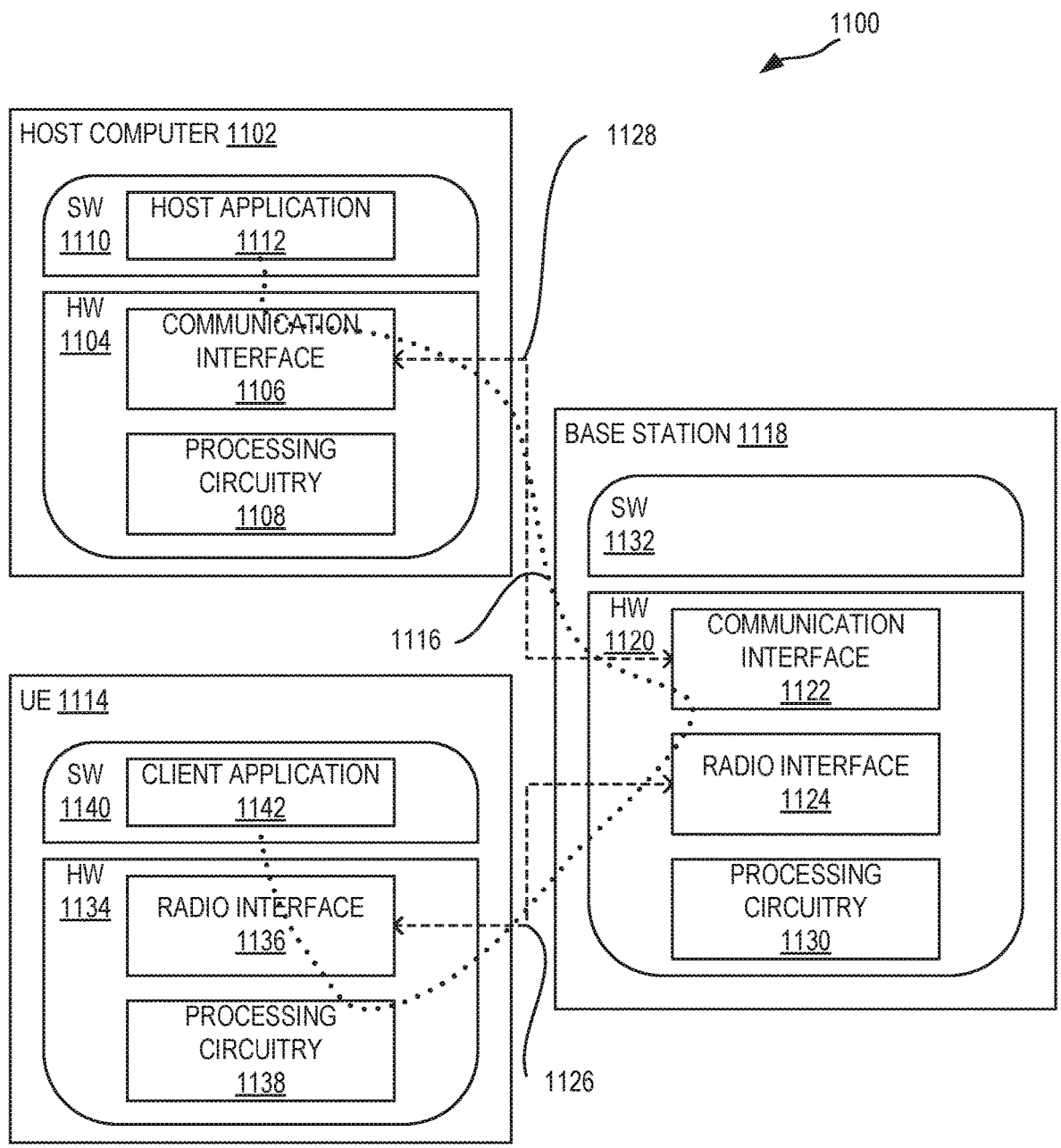
FIG. 11 illustrates example embodiments of the UE, base station, and host computer of FIG. 10.

It is noted that the host computer 1102, the base station 1118, and the UE 1114 illustrated in FIG. 11 may be similar or identical to the host computer 1016, one of the base stations 1006A, 1006B, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the base station 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further take decisions by which it dynamically changes the routing (e.g., on the basis of load balancing consideration or reconfiguration of the network).

The wireless connection 1126 between the UE 1114 and the base station 1118 is in accordance with the teachings of the embodiments described throughout this disclosure. One or more of the various embodiments improve the performance of OTT services provided to the UE 1114 using the OTT connection 1116, in which the wireless connection 1126 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the base station 1118, and it may be unknown or imperceptible to the base station 1118. Such procedures and functionalities may be known and practiced in the art. In certain embodiments, measurements may involve proprietary UE signaling facilitating the host computer 1102's measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

Figures 12, 13:
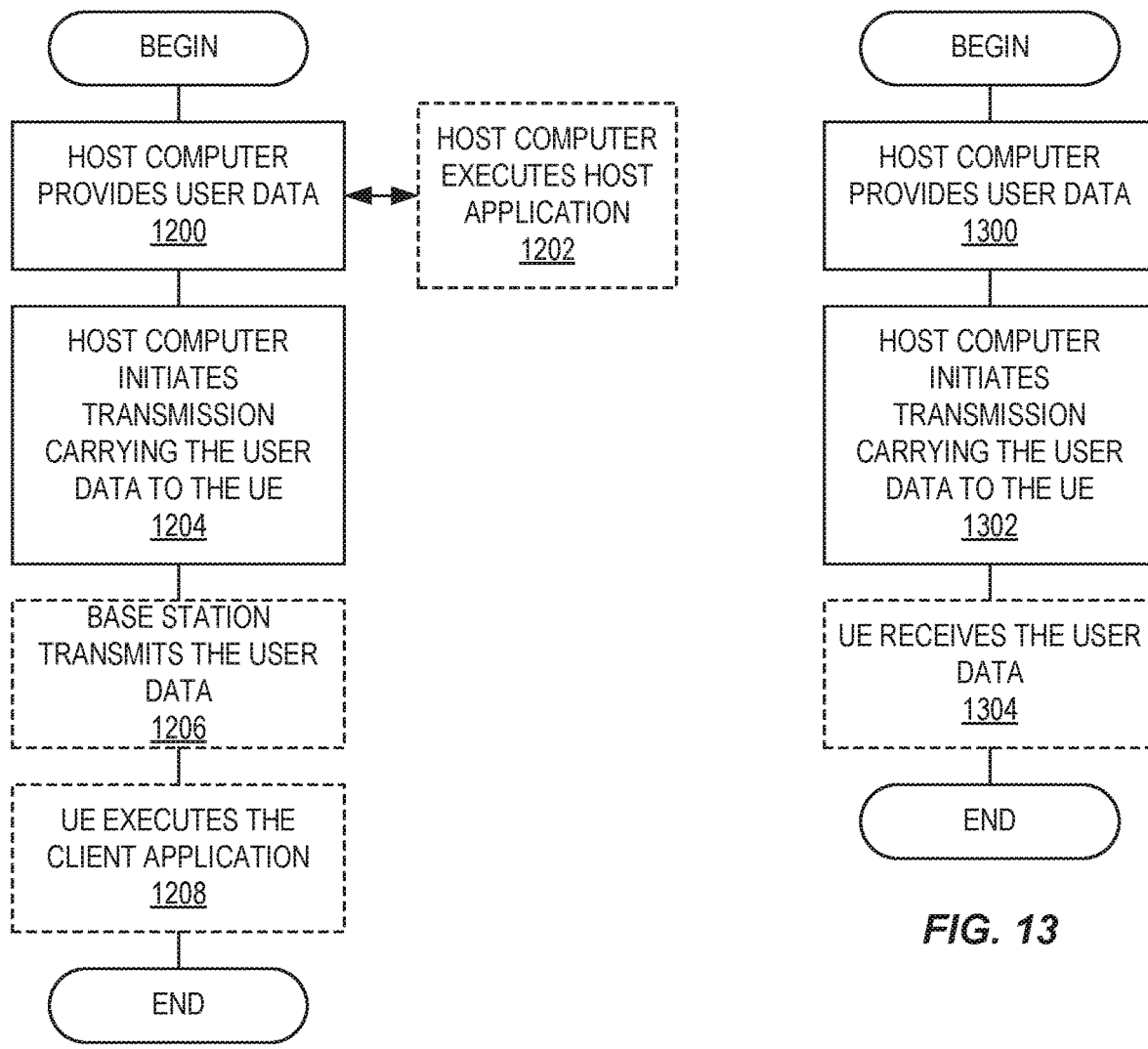
FIGS. 12 through 15 are flowcharts illustrating methods implemented in a communication system in accordance with some embodiments of the present disclosure.

FIG. 12 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 12 will be included in this section. In step 1200, the host computer provides user data. In sub-step 1202 (which may be optional) of step 1200, the host computer provides the user data by executing a host application. In step 1204, the host computer initiates a transmission carrying the user data to the UE. In step 1206 (which may be optional), the base station transmits to the UE the user data which was carried in the transmission that the host computer initiated, in accordance with the teachings of the embodiments described throughout this disclosure. In step 1208 (which may also be optional), the UE executes a client application associated with the host application executed by the host computer.

FIG. 13 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 13 will be included in this section. In step 1300 of the method, the host computer provides user data. In an optional sub-step (not shown) the host computer provides the user data by executing a host application. In step 1302, the host computer initiates a transmission carrying the user data to the UE. The transmission may pass via the base station, in accordance with the teachings of the embodiments described throughout this disclosure. In step 1304 (which may be optional), the UE receives the user data carried in the transmission.

Figure 14:
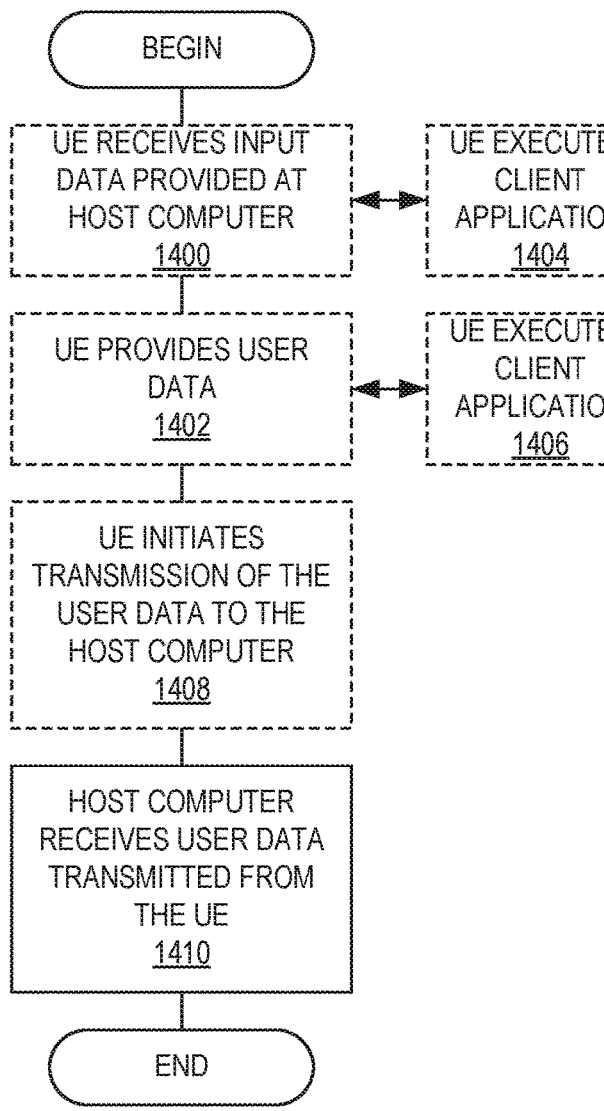

FIG. 14 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 14 will be included in this section. In step 1400 (which may be optional), the UE receives input data provided by the host computer. Additionally or alternatively, in step 1402, the UE provides user data. In sub-step 1404 (which may be optional) of step 1400, the UE provides the user data by executing a client application. In sub-step 1406 (which may be optional) of step 1402, the UE executes a client application which provides the user data in reaction to the received input data provided by the host computer. In providing the user data, the executed client application may further consider user input received from the user. Regardless of the specific manner in which the user data was provided, the UE initiates, in sub-step 1408 (which may be optional), transmission of the user data to the host computer. In step 1410 of the method, the host computer receives the user data transmitted from the UE, in accordance with the teachings of the embodiments described throughout this disclosure.

Figure 15:
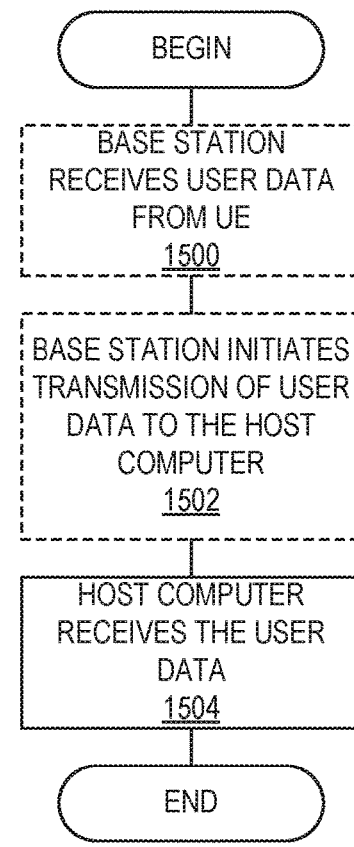

FIG. 15 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 15 will be included in this section. In step 1500 (which may be optional), in accordance with the teachings of the embodiments described throughout this disclosure, the base station receives user data from the UE. In step 1502 (which may be optional), the base station initiates transmission of the received user data to the host computer. In step 1504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device, the method comprising transmitting a random access preamble; receiving, from a base station, a random access response; and transmitting, to the base station, a Msg3 comprising one or more quality reports.

Embodiment 2: A method performed by a wireless device, the method comprising transmitting, to a base station, an uplink message comprising one or more quality reports.

Embodiment 3: The method of embodiment 2 further comprising detecting a trigger for sending the one or more quality reports, wherein transmitting the uplink message comprises transmitting the uplink message upon detecting the trigger.

Embodiment 4: The method of any one of embodiments 1 to 3 wherein the one or more quality reports comprise one or more quality reports for one or more carriers or narrowbands.

Embodiment 5: The method of embodiment 4 wherein, for each carrier or narrowband of the one or more carriers or narrowbands, the quality report for the carrier or narrowband comprises information that is indicative of a number of repetitions to be used for physical downlink control channel transmissions to the wireless device on the carrier or narrowband.

Embodiment 6: The method of embodiment 4 wherein, for each carrier or narrowband of the one or more carriers or narrowbands, the quality report for the carrier or narrowband comprises a value that is indicative of a number of repetitions to be used for physical downlink control channel transmissions to the wireless device on the carrier or narrowband, wherein the value is interpreted differently depending on a wireless device type of the wireless device.

Embodiment 7: The method of embodiment 4 wherein, for each carrier or narrowband of the one or more carriers or narrowbands, the quality report for the carrier or narrowband comprises a value that is indicative of a number of repetitions, wherein the value is interpreted differently depending on whether the wireless device is a NB-IoT UE or a MTC UE.

Embodiment 8: The method of any one of embodiments 4 to 7 wherein the one or more carriers comprise an anchor carrier of the wireless device, one or more non-anchor carriers of the wireless device, and/or both the anchor carrier of the wireless device and one or more non-anchor carriers of the wireless device.

Embodiment 9: The method of any one of embodiments 4 to 8 wherein, for each carrier or narrowband of the one or more carriers or narrowbands, the quality report for the carrier or narrowband comprises information that indicates the carrier or narrowband (e.g., a carrier index or narrowband index).

Embodiment 10: The method of any one of embodiments 1 to 3 wherein the one or more quality reports comprise a single quality report comprising an aggregate metric for two or more carriers or narrowbands.

Embodiment 11: The method of embodiment 10 wherein the aggregate metric is a number of repetitions to be used for physical downlink control channel transmissions to the wireless device on any of the two or more carriers or narrowbands, the aggregate metric being a function of measurements made by the wireless device on the two or more carriers or narrowbands.

Embodiment 12: The method of embodiment 10 or 11 wherein the quality report further comprises an indication that the aggregate metric is an aggregate metric.

Embodiment 13: The method of any one of embodiments 1 to 3 wherein the one or more quality reports comprise a single quality report comprising a metric value that is one of a plurality of predefined codepoints.

Embodiment 14: The method of embodiment 13 wherein the plurality of predefined codepoints representing a plurality of possible combinations of: a reported value; a combination of the one or more carriers or narrowbands; and an aggregation indication that indicates whether the metric value is an aggregate value for two or more carriers or narrowbands or a value for a single carrier or narrowband.

Embodiment 15: The method of any one of embodiments 1 to 3 wherein the one or more quality reports are comprised in a MAC CE structure.

Embodiment 16: The method of embodiment 15 wherein the one or more quality reports are a single quality report for a carrier or narrowband; and the quality report is comprised in a MAC CE octet in which 4 bits of the MAC CE octet represent a value that is indicative of a number of repetitions to be used for physical downlink control channel transmissions to the wireless device on the carrier or narrowband.

Embodiment 17: The method of embodiment 16 wherein a remaining 4 bits of the MAC CE octet are reserved.

Embodiment 18: The method of embodiment 15 wherein the one or more quality reports are a single quality report for a carrier or narrowband; and the quality report is comprised in a MAC CE octet in which 4 bits of the MAC CE octet represent a value that is indicative of a number of repetitions to be used for physical downlink control channel transmissions to the wireless device on the carrier or narrowband and a remaining 4 bits of the MAC CE octet represent an index of the carrier or narrowband.

Embodiment 19: The method of embodiment 15 wherein the one or more quality reports are a single quality report that comprises a single reported value that is either for a single carrier or narrowband or for a combination of two or more carriers or narrowbands, respectively; and the quality report is comprised in a MAC CE octet in which 4 bits of the MAC CE octet represent the single reported value that is indicative of a number of repetitions to be used for physical downlink control channel transmissions to the wireless device, 1 bit of the MAC CE octet is an indication of whether the single reported value is for a single carrier or narrowband or a combination of two or more carriers or narrowbands.

Embodiment 20: The method of embodiment 19 wherein a remaining 3 bits of the MAC CE octet are reserved.

Embodiment 21: The method of embodiment 15 wherein the one or more quality reports are a single quality report for one or more carriers or narrowbands, respectively, encoded a single codepoint value from a plurality of possible codepoint values; and the single codepoint value is comprised in a MAC CE octet.

Embodiment 22: The method of embodiment 15 wherein the one or more quality reports are a single quality report that comprises a single reported value that is either for a single carrier or narrowband or for a combination of two or more carriers or narrowbands, respectively; and the quality report is comprised in two MAC CE octets in which 4 bits of one of the two MAC CE octets represent the single reported value that is indicative of a number of repetitions to be used for physical downlink control channel transmissions to the wireless device, another 4 bits of one of the two MAC CE octets represent an index of the carrier or narrowband if the quality report is for a single carrier or narrowband, and another 1 bit of one of the two MAC CE octets is an indication of whether the single reported value is for a single carrier or narrowband or a combination of two or more carriers or narrowbands.

Embodiment 23: The method of embodiment 22 wherein a remaining 7 bits of the two MAC CE octets are reserved.

Embodiment 24: The method of embodiment 15 wherein the MAC CE structure supports a fixed number of quality reports.

Embodiment 25: The method of embodiment 15 wherein the MAC CE structure supports a variable number of quality reports.

Embodiment 26: The method of embodiment 24 or 25 wherein the one or more quality reports are one or more quality reports for one or more carriers or narrowbands, respectively; and for each carrier or narrowband of one or more carriers or narrowbands, the quality report for the carrier or narrowband is comprised in a MAC CE octet in which 4 bits of the MAC CE octet represent a value that is indicative of a number of repetitions to be used for physical downlink control channel transmissions to the wireless device on the carrier or narrowband.

Embodiment 27: The method of embodiment 26 wherein a remaining 4 bits of the MAC CE octet are reserved.

Embodiment 28: The method of embodiment 24 or 25 wherein the one or more quality reports are one or more quality reports for one or more carriers or narrowbands, respectively; and for each carrier or narrowband of one or more carriers or narrowbands, the quality report for the carrier or narrowband is comprised in a MAC CE octet in which 4 bits of the MAC CE octet represent a value that is indicative of a number of repetitions to be used for physical downlink control channel transmissions to the wireless device on the carrier or narrowband and a remaining 4 bits of the MAC CE octet represent an index of the carrier or narrowband.

Embodiment 29: The method of any one of embodiments 1 to 14 wherein the one or more quality reports are comprised in an RRC message.

Embodiment 30: The method of embodiment 29 wherein the RRC message is provided in accordance with a predefined RRC message structure that supports a fixed number of quality reports.

Embodiment 31: The method of embodiment 29 wherein the RRC message is provided in accordance with a predefined RRC message structure that supports a variable number of quality reports.

Embodiment 32: The method of any one of embodiments 1 to 31 further comprising receiving, from a network node (e.g., the base station), a configuration or reconfiguration of a measurement mechanism and/or a reporting mechanism utilized by the wireless device with respect to a quality report(s) comprised in a Msg3 transmission.

Embodiment 33: The method of any of the previous embodiments, further comprising providing user data; and forwarding the user data to a host computer via the transmission to the base station.

Group B Embodiments

Embodiment 34: A method performed by a base station, the method comprising receiving, from a wireless device, a random access preamble; transmitting, to the wireless device, a random access response; and receiving, from the wireless device, a Msg3 comprising one or more quality reports; and utilizing the one or more quality reports.

Embodiment 35: A method performed by a base station, the method comprising receiving, from a wireless device, an uplink message comprising one or more quality reports.

Embodiment 36: The method of embodiment 35 further comprising triggering the wireless device to transmit the one or more quality reports.

Embodiment 37: The method of any one of embodiments 34 to 36 wherein the one or more quality reports comprise one or more quality reports for one or more carriers or narrowbands.

Embodiment 38: The method of embodiment 37 wherein, for each carrier or narrowband of the one or more carriers or narrowbands, the quality report for the carrier or narrowband comprises information that is indicative of a number of repetitions to be used for physical downlink control channel transmissions to the wireless device on the carrier or narrowband.

Embodiment 39: The method of embodiment 37 wherein, for each carrier or narrowband of the one or more carriers or narrowbands, the quality report for the carrier or narrowband comprises a value that is indicative of a number of repetitions to be used for physical downlink control channel transmissions to the wireless device on the carrier or narrowband, wherein the value is interpreted differently depending on a wireless device type of the wireless device.

Embodiment 40: The method of embodiment 37 wherein, for each carrier or narrowband of the one or more carriers or narrowbands, the quality report for the carrier or narrowband comprises a value that is indicative of a number of repetitions, wherein the value is interpreted differently depending on whether the wireless device is a NB-IoT UE or a MTC UE.

Embodiment 41: The method of any one of embodiments 37 to 40 wherein the one or more carriers comprise an anchor carrier of the wireless device, one or more non-anchor carriers of the wireless device, and/or both the anchor carrier of the wireless device and one or more non-anchor carriers of the wireless device.

Embodiment 42: The method of any one of embodiments 37 to 41 wherein, for each carrier or narrowband of the one or more carriers or narrowbands, the quality report for the carrier or narrowband comprises information that indicates the carrier or narrowband (e.g., a carrier index or narrowband index).

Embodiment 43: The method of embodiment 36 wherein the one or more quality reports comprise a single quality report comprising an aggregate metric for two or more carriers or narrowbands.

Embodiment 44: The method of embodiment 43 wherein the aggregate metric is a number of repetitions to be used for physical downlink control channel transmissions to the wireless device on any of the two or more carriers or narrowbands, the aggregate metric being a function of measurements made by the wireless device on the two or more carriers or narrowbands.

Embodiment 45: The method of embodiment 43 or 44 wherein the quality report further comprises an indication that the aggregate metric is an aggregate metric.

Embodiment 46: The method of any one of embodiments 32 to 34 wherein the one or more quality reports comprise a single quality report comprising a metric value that is one of a plurality of predefined codepoints.

Embodiment 47: The method of embodiment 46 wherein the plurality of predefined codepoints representing a plurality of possible combinations of a reported value; a combination of the one or more carriers or narrowbands; and an aggregation indication that indicates whether the metric value is an aggregate value for two or more carriers or narrowbands or a value for a single carrier or narrowband.

Embodiment 48: The method of any one of embodiments 32 to 34 wherein the one or more quality reports are comprised in a MAC CE structure.

Embodiment 49: The method of embodiment 48 wherein the one or more quality reports are a single quality report for a carrier or narrowband; and the quality report is comprised in a MAC CE octet in which 4 bits of the MAC CE octet represent a value that is indicative of a number of repetitions to be used for physical downlink control channel transmissions to the wireless device on the carrier or narrowband.

Embodiment 50: The method of embodiment 49 wherein a remaining 4 bits of the MAC CE octet are reserved.

Embodiment 51: The method of embodiment 48 wherein the one or more quality reports are a single quality report for a carrier or narrowband; and the quality report is comprised in a MAC CE octet in which 4 bits of the MAC CE octet represent a value that is indicative of a number of repetitions to be used for physical downlink control channel transmissions to the wireless device on the carrier or narrowband and a remaining 4 bits of the MAC CE octet represent an index of the carrier or narrowband.

Embodiment 52: The method of embodiment 48 wherein the one or more quality reports are a single quality report that comprises a single reported value that is either for a single carrier or narrowband or for a combination of two or more carriers or narrowbands, respectively; and the quality report is comprised in a MAC CE octet in which 4 bits of the MAC CE octet represent the single reported value that is indicative of a number of repetitions to be used for physical downlink control channel transmissions to the wireless device, 1 bit of the MAC CE octet is an indication of whether the single reported value is for a single carrier or narrowband or a combination of two or more carriers or narrowbands.

Embodiment 53: The method of embodiment 52 wherein a remaining 3 bits of the MAC CE octet are reserved.

Embodiment 54: The method of embodiment 48 wherein the one or more quality reports are a single quality report for one or more carriers or narrowbands, respectively, encoded a single codepoint value from a plurality of possible codepoint values; and the single codepoint value is comprised in a MAC CE octet.

Embodiment 55: The method of embodiment 48 wherein the one or more quality reports are a single quality report that comprises a single reported value that is either for a single carrier or narrowband or for a combination of two or more carriers or narrowbands, respectively; and the quality report is comprised in two MAC CE octets in which 4 bits of one of the two MAC CE octets represent the single reported value that is indicative of a number of repetitions to be used for physical downlink control channel transmissions to the wireless device, another 4 bits of one of the two MAC CE octets represent an index of the carrier or narrowband if the quality report is for a single carrier or narrowband, and another 1 bit of one of the two MAC CE octets is an indication of whether the single reported value is for a single carrier or narrowband or a combination of two or more carriers or narrowbands.

Embodiment 56: The method of embodiment 55 wherein a remaining 7 bits of the two MAC CE octets are reserved.

Embodiment 57: The method of embodiment 48 wherein the MAC CE structure supports a fixed number of quality reports.

Embodiment 58: The method of embodiment 48 wherein the MAC CE structure supports a variable number of quality reports.

Embodiment 59: The method of embodiment 57 or 58 wherein the one or more quality reports are one or more quality reports for one or more carriers or narrowbands, respectively; and for each carrier or narrowband of one or more carriers or narrowbands, the quality report for the carrier or narrowband is comprised in a MAC CE octet in which 4 bits of the MAC CE octet represent a value that is indicative of a number of repetitions to be used for physical downlink control channel transmissions to the wireless device on the carrier or narrowband.

Embodiment 60: The method of embodiment 59 wherein a remaining 4 bits of the MAC CE octet are reserved.

Embodiment 61: The method of embodiment 58 or 59 wherein the one or more quality reports are one or more quality reports for one or more carriers or narrowbands, respectively; and for each carrier or narrowband of one or more carriers or narrowbands, the quality report for the carrier or narrowband is comprised in a MAC CE octet in which 4 bits of the MAC CE octet represent a value that is indicative of a number of repetitions to be used for physical downlink control channel transmissions to the wireless device on the carrier or narrowband and a remaining 4 bits of the MAC CE octet represent an index of the carrier or narrowband.

Embodiment 62: The method of any one of embodiments 34 to 47 wherein the one or more quality reports are comprised in an RRC message.

Embodiment 63: The method of embodiment 62 wherein the RRC message is provided in accordance with a pre-defined RRC message structure that supports a fixed number of quality reports.

Embodiment 64: The method of embodiment 62 wherein the RRC message is provided in accordance with a pre-defined RRC message structure that supports a variable number of quality reports.

Embodiment 65: The method of any one of embodiments 24 to 64 further comprising transmitting, to the wireless device, a configuration or reconfiguration of a measurement mechanism and/or a reporting mechanism utilized by the wireless device with respect to a quality report(s) comprised in a Msg3 transmission.

Embodiment 66: The method of any of the previous embodiments, further comprising obtaining user data; and forwarding the user data to a host computer or a wireless device.

Group C Embodiments

Embodiment 67: A wireless device, the wireless device comprising processing circuitry configured to perform any of the steps of any of the Group A embodiments; and power supply circuitry configured to supply power to the wireless device.

Embodiment 68: A base station, the base station comprising processing circuitry configured to perform any of the steps of any of the Group B embodiments; and power supply circuitry configured to supply power to the base station.

Embodiment 69: A User Equipment, UE, comprising an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 70: A communication system including a host computer comprising processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 71: The communication system of the previous embodiment further including the base station.

Embodiment 72: The communication system of the previous 2 embodiments, further including the UE, wherein the UE is configured to communicate with the base station.

Embodiment 73: The communication system of the previous 3 embodiments, wherein the processing circuitry of the host computer is configured to execute a host application, thereby providing the user data; and the UE comprises processing circuitry configured to execute a client application associated with the host application.

Embodiment 74: A method implemented in a communication system including a host computer, a base station, and a User Equipment, UE, the method comprising at the host computer, providing user data; and at the host computer, initiating a transmission carrying the user data to the UE via a cellular network comprising the base station, wherein the base station performs any of the steps of any of the Group B embodiments.

Embodiment 75: The method of the previous embodiment, further comprising, at the base station, transmitting the user data.

Embodiment 76: The method of the previous 2 embodiments, wherein the user data is provided at the host computer by executing a host application, the method further comprising, at the UE, executing a client application associated with the host application.

Embodiment 77: A User Equipment, UE, configured to communicate with a base station, the UE comprising a radio interface and processing circuitry configured to perform the method of the previous 3 embodiments.

Embodiment 78: A communication system including a host computer comprising processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 79: The communication system of the previous embodiment, wherein the cellular network further includes a base station configured to communicate with the UE.

Embodiment 80: The communication system of the previous 2 embodiments, wherein the processing circuitry of the host computer is configured to execute a host application, thereby providing the user data; and the UE's processing circuitry is configured to execute a client application associated with the host application.

Embodiment 81: A method implemented in a communication system including a host computer, a base station, and a User Equipment, UE, the method comprising at the host computer, providing user data; and at the host computer, initiating a transmission carrying the user data to the UE via a cellular network comprising the base station, wherein the UE performs any of the steps of any of the Group A embodiments.

Embodiment 82: The method of the previous embodiment, further comprising at the UE, receiving the user data from the base station.

Embodiment 83: A communication system including a host computer comprising communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 84: The communication system of the previous embodiment, further including the UE.

Embodiment 85: The communication system of the previous 2 embodiments, further including the base station, wherein the base station comprises a radio interface configured to communicate with the UE and a communication interface configured to forward to the host computer the user data carried by a transmission from the UE to the base station.

Embodiment 86: The communication system of the previous 3 embodiments, wherein the processing circuitry of the host computer is configured to execute a host application; and the UE's processing circuitry is configured to execute a client application associated with the host application, thereby providing the user data.

Embodiment 87: The communication system of the previous 4 embodiments, wherein the processing circuitry of the host computer is configured to execute a host application, thereby providing request data; and the UE's processing circuitry is configured to execute a client application associated with the host application, thereby providing the user data in response to the request data.

Embodiment 88: A method implemented in a communication system including a host computer, a base station, and a User Equipment, UE, the method comprising at the host computer, receiving user data transmitted to the base station from the UE, wherein the UE performs any of the steps of any of the Group A embodiments.

Embodiment 89: The method of the previous embodiment, further comprising, at the UE, providing the user data to the base station.

Embodiment 90: The method of the previous 2 embodiments, further comprising at the UE, executing a client application, thereby providing the user data to be transmitted; and at the host computer, executing a host application associated with the client application.

Embodiment 91: The method of the previous 3 embodiments, further comprising at the UE, executing a client application; and at the UE, receiving input data to the client application, the input data being provided at the host computer by executing a host application associated with the client application; wherein the user data to be transmitted is provided by the client application in response to the input data.

Embodiment 92: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 93: The communication system of the previous embodiment further including the base station.

Embodiment 94: The communication system of the previous 2 embodiments, further including the UE, wherein the UE is configured to communicate with the base station.

Embodiment 95: The communication system of the previous 3 embodiments, wherein the processing circuitry of the host computer is configured to execute a host application; and the UE is configured to execute a client application associated with the host application, thereby providing the user data to be received by the host computer.

Embodiment 96: A method implemented in a communication system including a host computer, a base station, and a User Equipment, UE, the method comprising at the host computer, receiving, from the base station, user data originating from a transmission which the base station has received from the UE, wherein the UE performs any of the steps of any of the Group A embodiments.

Embodiment 97: The method of the previous embodiment, further comprising at the base station, receiving the user data from the UE.

Embodiment 98: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device
DAS Distributed Antenna System
DSP Digital Signal Processor
DVD Digital Video Disk
eMTC Enhanced Machine Type Communication
eNB Enhanced or Evolved Node B
E-SMLC Evolved Serving Mobile Location Center
FPGA Field Programmable Gate Array
GHz Gigahertz
gNB New Radio Base Station
gNB-CU New Radio Base Station Central Unit
gNB-DU New Radio Base Station Distributed Unit
GSM Global System for Mobile Communications
IoT Internet of Things
IP Internet Protocol
LEE Laptop Embedded Equipment
LME Laptop Mounted Equipment
LTE Long Term Evolution
MAC Medium Access Control
MAC CE Medium Access Control Element
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
NRF Network Function Repository Function
O&M Operation and Maintenance
OSS Operations Support System
OTT Over-the-Top
PC Personal Computer
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory RRC Radio Resource Control
RRH Remote Radio Head
RRU Remote Radio Unit
SCEF Service Capability Exposure Function
SOC System on a Chip
SON Self-Organizing Network
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

REFERENCES

[1] 3GPP TS 36.321, Medium Access Control (MAC) Protocol Specification", v15.0.0
[2] 3GPP TS 36.133, Requirements for support of radio resource management, v15.4.0
[3] RP-181450, Rel-16 MTC enhancements for LTE, La Jolla, June 2018
[4] RP-181451, Rel-16 enhancements for NB-IoT, La Jolla, June 2018
[5] RP-182594, Additional MTC enhancements for LTE, Sorrento, Italy, December 2018
[6] R2-1818633, RAN2 agreements for Rel-16 additional enhancements for NB-IoT and MTC, Spokane, US, November 2018
[7] R1-1813796, RAN1 agreements for Rel-16 Additional Enhancements for NB-IoT, Spokane, US, November 2018
[8] 3GPP TS 36.321, Medium Access Control (MAC) protocol specification, v15.3.0, September 2018

What is claimed is:

1. A method performed by a wireless device, the method comprising:
    transmitting, to a base station, an uplink message comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level, the uplink message being transmitted by the wireless device when in connected mode;
    the one or more quality reports comprising a single quality report comprising an aggregate metric for two or more carriers or narrowbands; and
    the one or more quality reports comprise a quality report comprising a metric value that is one of a plurality of predefined codepoints representing a plurality of possible combinations of:
        the value indicating the number of repetitions;
        an index(es) of the one or more carriers or narrowbands; and
        an aggregation indication that indicates whether the metric value is an aggregate value for two or more carriers or narrowbands or a value for a single carrier or narrowband.

2. The method of claim 1, further comprising:
    transmitting a random access preamble; and
    receiving, from the base station, a random access response;
    wherein transmitting the uplink message comprises transmitting, to the base station, a Msg3 comprising the one or more quality reports for the one or more carriers or narrowbands.

3. The method of claim 2, wherein the one or more carriers or narrowbands comprise a non-anchor carrier of the wireless device on which measurement is performed during a time from a beginning of receiving the random access response until a beginning of transmitting, to the base station, the Msg3.

4. The method of claim 1, wherein the aggregate metric is a number of repetitions to be used for physical downlink control channel transmissions to the wireless device on any of the two or more carriers or narrowbands, the aggregate metric being a function of measurements made by the wireless device on the two or more carriers or narrowbands.

5. The method of claim 1, wherein the one or more carriers or narrowbands comprise one or more non-anchor carriers, wherein a non-anchor carrier is a carrier other than an anchor carrier of the wireless device where an anchor carrier is a carrier on which the wireless device receives synchronization signals as well as broadcast information.

6. The method of claim 1, wherein transmitting the uplink message is triggered by the base station.

7. The method of claim 1, wherein the one or more quality reports are comprised within the uplink message in a Medium Access Control, MAC, Control Element, CE, structure.

8. The method of claim 7, wherein:
    the one or more quality reports are a single quality report for a carrier or narrowband; and
    the single quality report is comprised in a MAC CE octet in which 4 bits of the MAC CE octet represent the value indicative of the number of repetitions.

9. The method of claim 8, wherein a remaining 4 bits of the MAC CE octet represent an index of the carrier or narrowband.

10. The method of claim 7, wherein:
    the one or more quality reports are a single quality report for a carrier or narrowband; and
    the single quality report is comprised in a MAC CE octet in which 4 bits of the MAC CE octet represent the aggregate value.

11. The method of claim 7, wherein:
    the one or more quality reports are a single quality report that comprises a single reported value that is indicative of a number of repetitions for either a single carrier or narrowband or for a combination of two or more carriers or narrowbands; and
    the single quality report is comprised in a MAC CE octet in which 4 bits of the MAC CE octet represent the single reported value and 1 bit of the MAC CE octet is an indication of whether the single reported value is for a single carrier or narrowband or a combination of two or more carriers or narrowbands.

12. The method of claim 7, wherein:
    the one or more quality reports are a single quality report that comprises a single reported value indicative of a number of repetitions that is either for a single carrier or narrowband or for a combination of two or more carriers or narrowbands; and the single quality report is comprised in two MAC CE octets in which 4 bits of one of the two MAC CE octets represent the single reported value, another 4 bits of one of the two MAC CE octets represent an index of the single carrier or narrowband if the quality report is for a single carrier or narrowband, and another 1 bit of one of the two MAC CE octets is an indication of whether the single reported value is for a single carrier or narrowband or a combination of two or more carriers or narrowbands.

13. The method of claim 1, wherein the one or more quality reports are one or more quality reports for one or more carriers or narrowbands, respectively; and for each carrier or narrowband of the one or more carriers or narrowbands, the quality report for the carrier or narrowband is comprised in a MAC CE octet in which 4 bits of the MAC CE octet represent the value that is indicative of the number of repetitions.

14. The method of claim 1, wherein:

the one or more quality reports are one or more quality reports for one or more carriers or narrowbands, respectively; and for each carrier or narrowband of the one or more carriers or narrowbands, the quality report for the carrier or narrowband is comprised in a MAC CE octet in which 4 bits of the MAC CE octet represent the value that is indicative of the number of repetitions and a remaining 4 bits of the MAC CE octet represent an index of the carrier or narrowband.

15. A method performed by a base station, the method comprising:

receiving, from the wireless device, an uplink message comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level, the uplink message being transmitted by the wireless device when in connected mode, the one or more quality reports comprising a single quality report comprising an aggregate metric for two or more carriers or narrowbands;

utilizing the one or more quality reports; and the one or more quality reports comprise a quality report comprising a metric value that is one of a plurality of predefined codepoints representing a plurality of possible combinations of:

the value indicating the number of repetitions;

an index(es) of the one or more carriers or narrowbands; and an aggregation indication that indicates whether the metric value is an aggregate value for two or more carriers or narrowbands or a value for a single carrier or narrowband.

16. A wireless device comprising:

a processor configured to cause the wireless device to:

transmit, to a base station, an uplink message comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level, the uplink message being transmitted by the wireless device when in connected mode; and the one or more quality reports comprising a single quality report comprising an aggregate metric for two or more carriers or narrowbands; and the one or more quality reports comprise a quality report comprising a metric value that is one of a plurality of predefined codepoints representing a plurality of possible combinations of:

the value indicating the number of repetitions;

an index(es) of the one or more carriers or narrowbands; and an aggregation indication that indicates whether the metric value is an aggregate value for two or more carriers or narrowbands or a value for a single carrier or narrowband.

17. A base station comprising:

a processor configured to cause the base station to:

receive, from the wireless device, an uplink message comprising one or more quality reports for one or more carriers or narrowbands, each of the one or more quality reports comprising at least one of a value that is indicative of a number of repetitions to be used for physical downlink control channel transmissions to the wireless device on the one or more carriers or narrowbands and an aggregation level, the uplink message being transmitted by the wireless device when in connected mode, the one or more quality reports comprising a single quality report comprising an aggregate metric for two or more carriers or narrowbands;

utilize the one or more quality reports; and the one or more quality reports comprise a quality report comprising a metric value that is one of a plurality of predefined codepoints representing a plurality of possible combinations of:

the value indicating the number of repetitions;

an index(es) of the one or more carriers or narrowbands; and an aggregation indication that indicates whether the metric value is an aggregate value for two or more carriers or narrowbands or a value for a single carrier or narrowband.

* * * * *